United States Patent [19]

van der Haar et al.

[11] 4,383,537
[45] May 17, 1983

[54] METHOD AND APPARATUS FOR INSPECTING AND CUTTING CIGAR WRAPPERS

[75] Inventors: Rijk van de Haar, Joure, Netherlands; Brian M. Hopkins, Cambridge, England; Jan C. van Hattem, Amerongen, Netherlands

[73] Assignee: Douwe Egberts Koninklijke Tabaksfabriek-Koffiebranderijen-Theehandel B.V., Utrecht, Netherlands

[21] Appl. No.: 934,993

[22] Filed: Aug. 18, 1978

[30] Foreign Application Priority Data

Aug. 25, 1977 [GB] United Kingdom ............... 35631/77

[51] Int. Cl.³ .............................................. A24C 5/00
[52] U.S. Cl. ...................................... 131/280; 53/371
[58] Field of Search ................ 131/15, 140 R, 147 R, 131/77, 122, 148, 149, 105, 110, 21, 23; 83/371, 365; 358/108

[56] References Cited

U.S. PATENT DOCUMENTS 4,094,325 6/1978 Stoffers et al. ............. 131/140 R X
4,103,692 8/1978 Baier et al. ............................ 131/32

FOREIGN PATENT DOCUMENTS

| 974635 | 11/1964 | United Kingdom . |
| 1086688 | 10/1967 | United Kingdom . |
| 1086431 | 11/1967 | United Kingdom . |
| 1204951 | 9/1970 | United Kingdom . |
| 1228637 | 4/1971 | United Kingdom . |
| 1321464 | 6/1973 | United Kingdom . |
| 1355235 | 6/1974 | United Kingdom . |

*Primary Examiner*—Stephen C. Pellegrino
*Attorney, Agent, or Firm*—Cushman, Darby & Cushman

[57] ABSTRACT

A system for analyzing and cutting tobacco leaves for cigar wrappers in which each leaf is conveyed to a scanner which scans discrete areas in parallel lines to produce sequences of digital signals, each sequence representing a line and each signal indicating the presence or absence of a hole. The signals of each line, after a delay, are superimposed and the composite signal checked to ascertain if one or more hole free parallelograms of at least one given size can be cut from the leaf. After scanning the leaf is conveyed to another location and cut.

19 Claims, 38 Drawing Figures

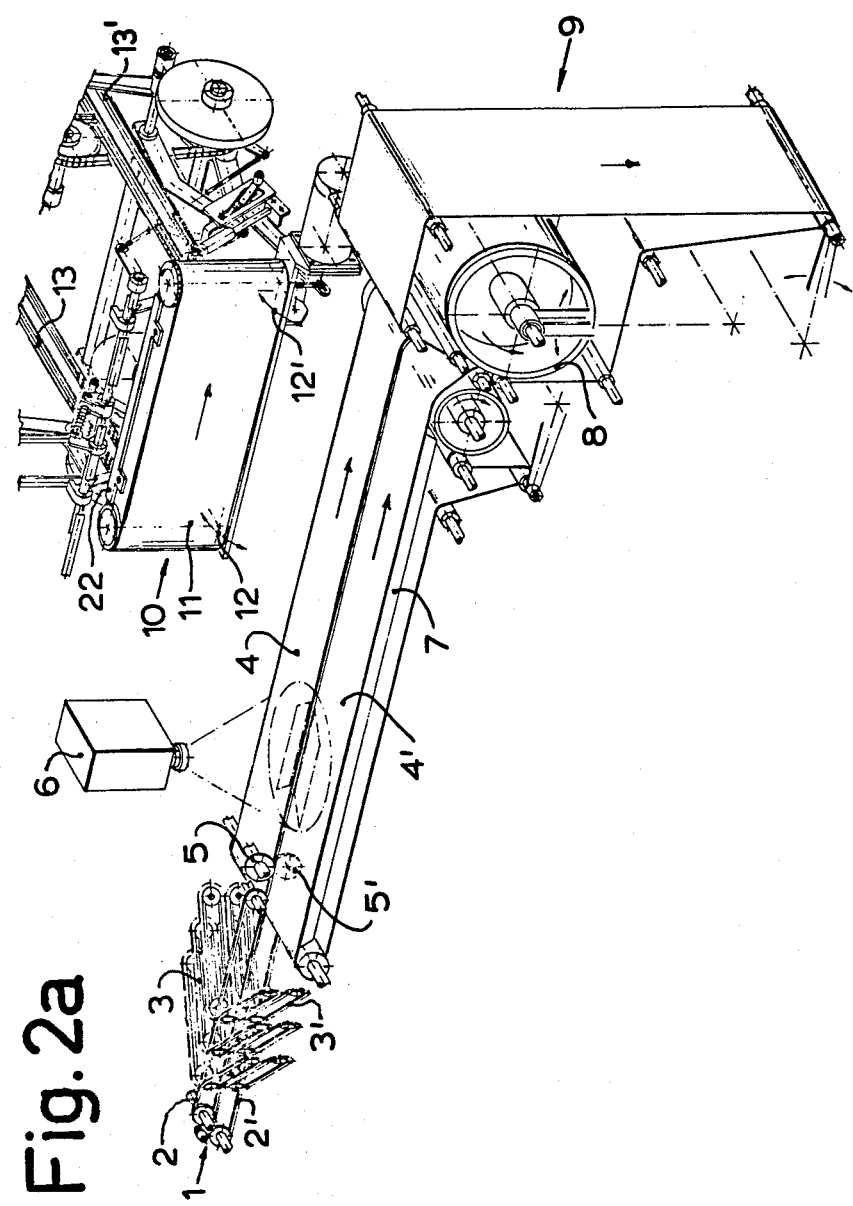

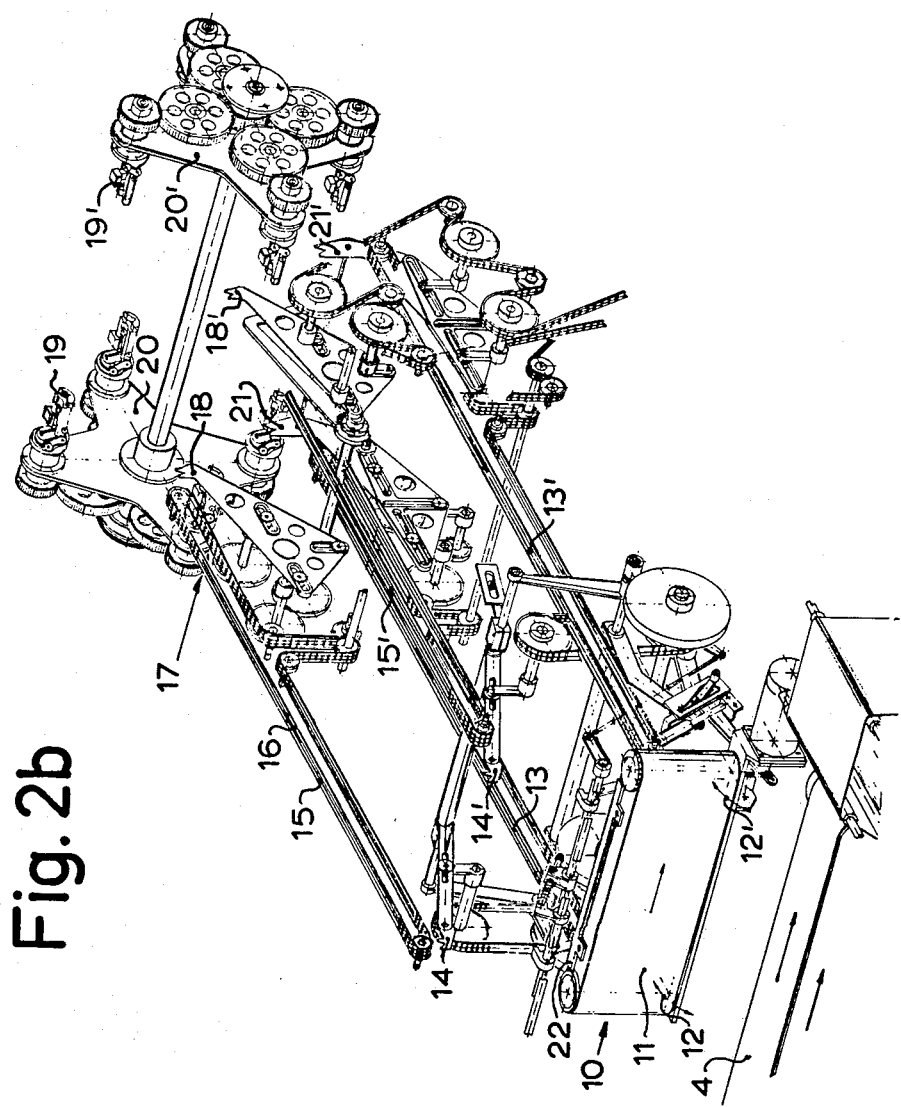

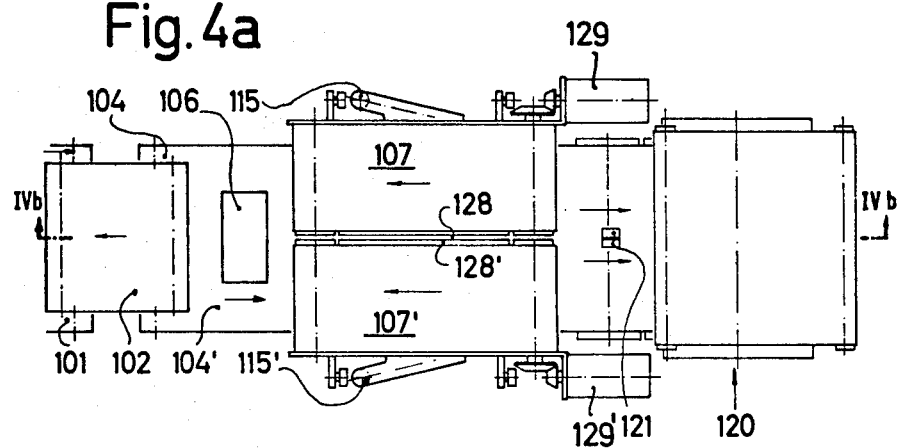
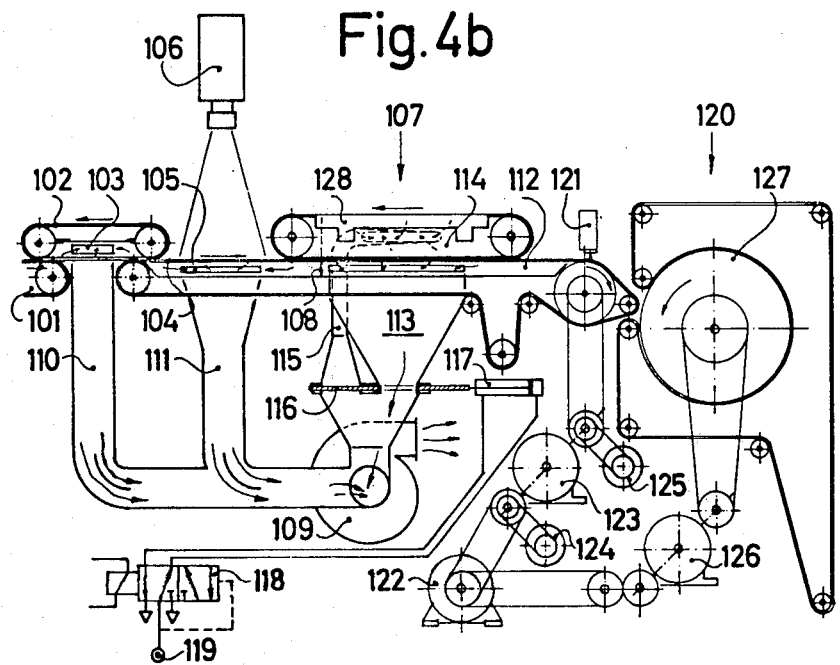

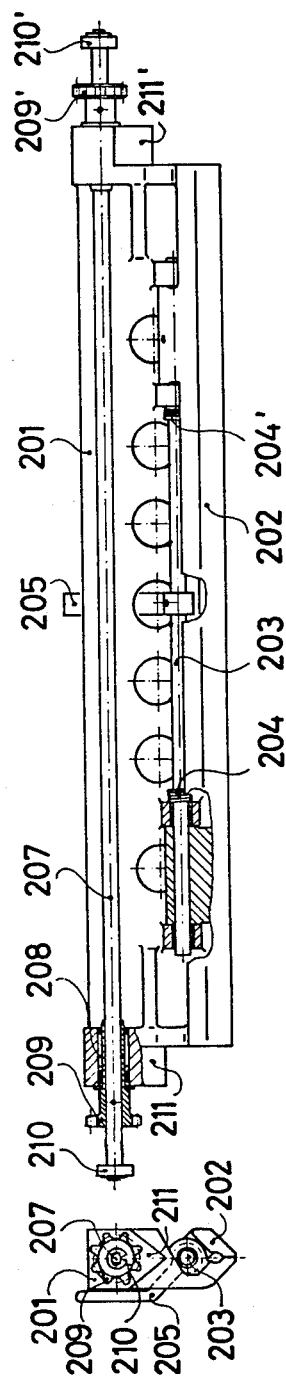

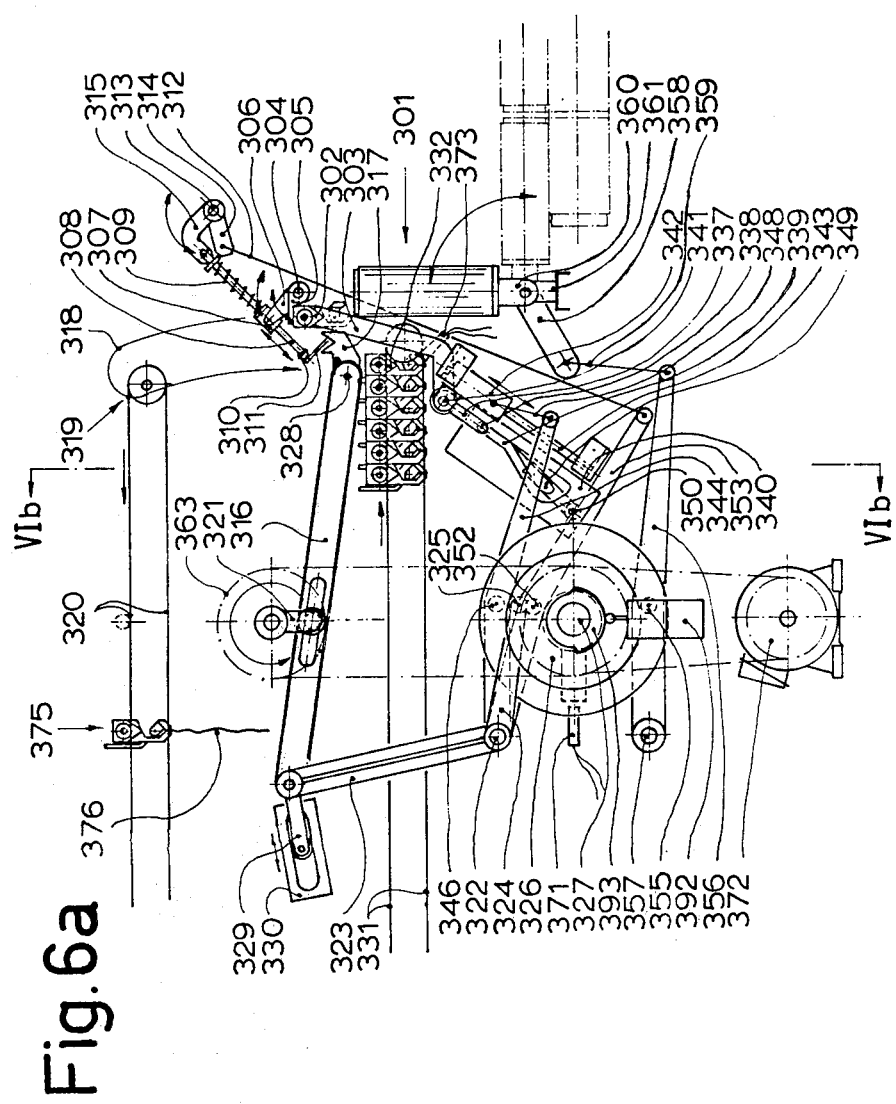

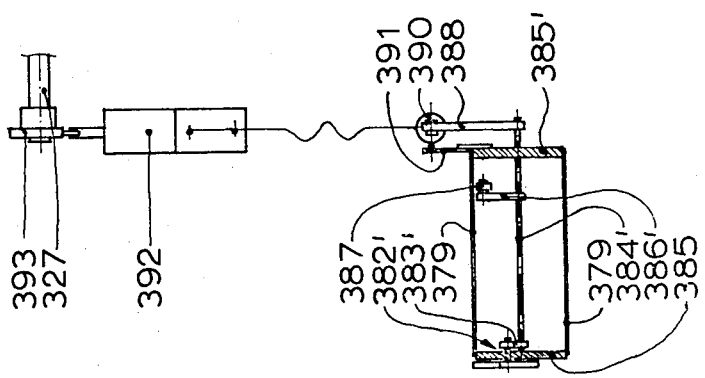
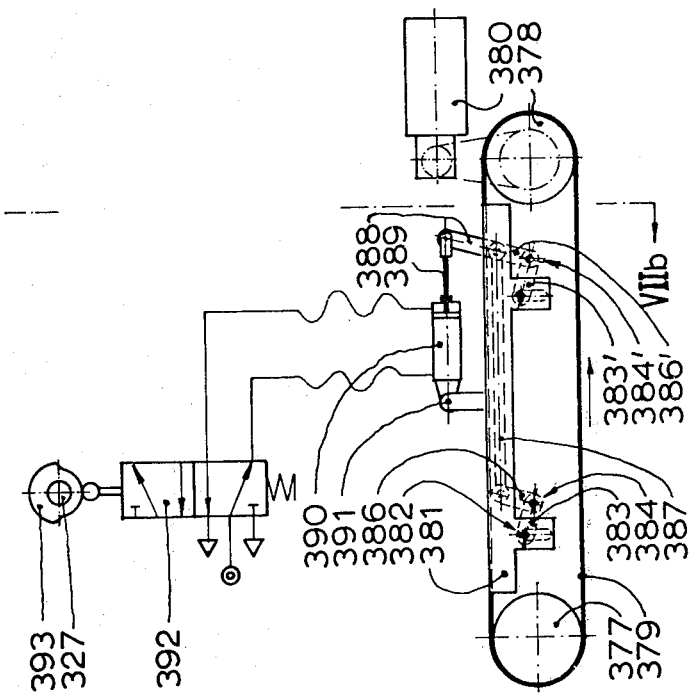

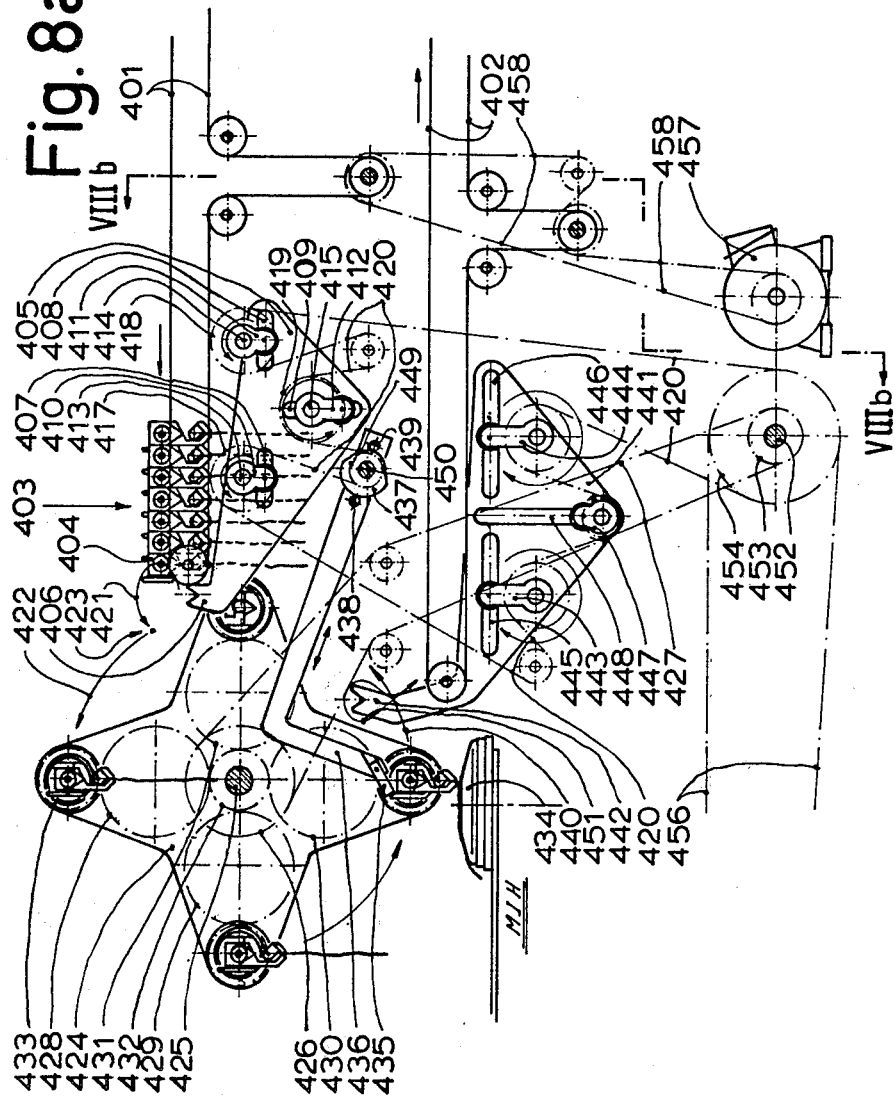

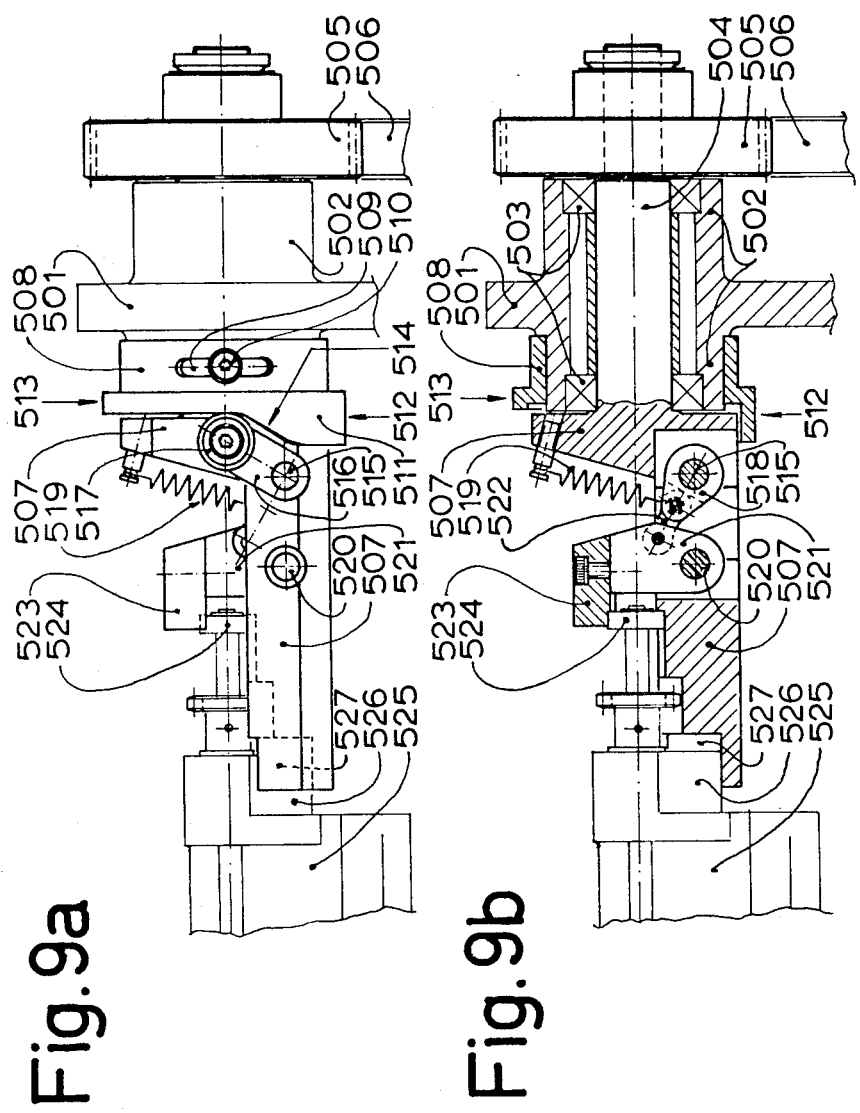

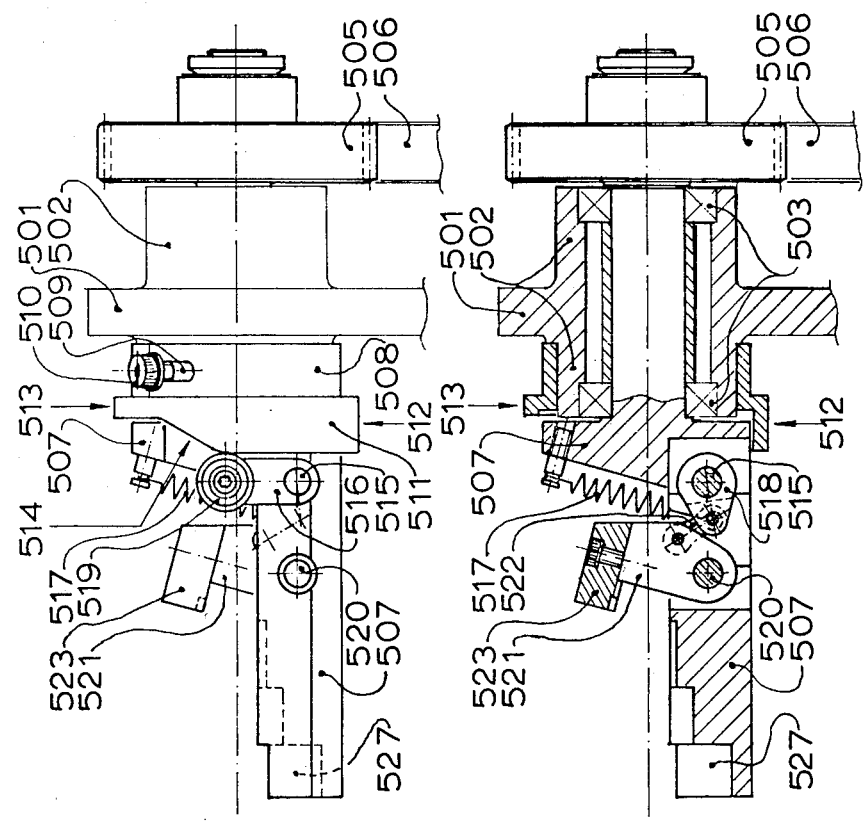

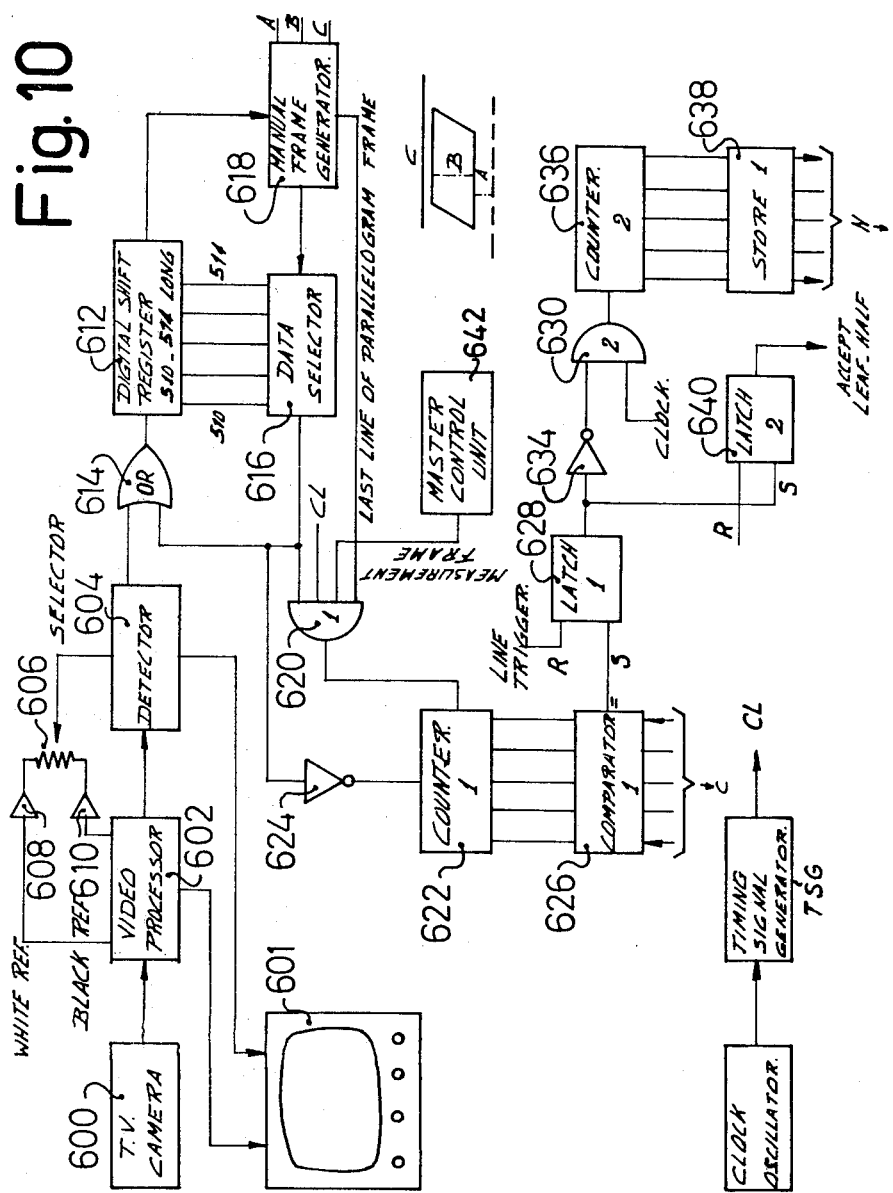

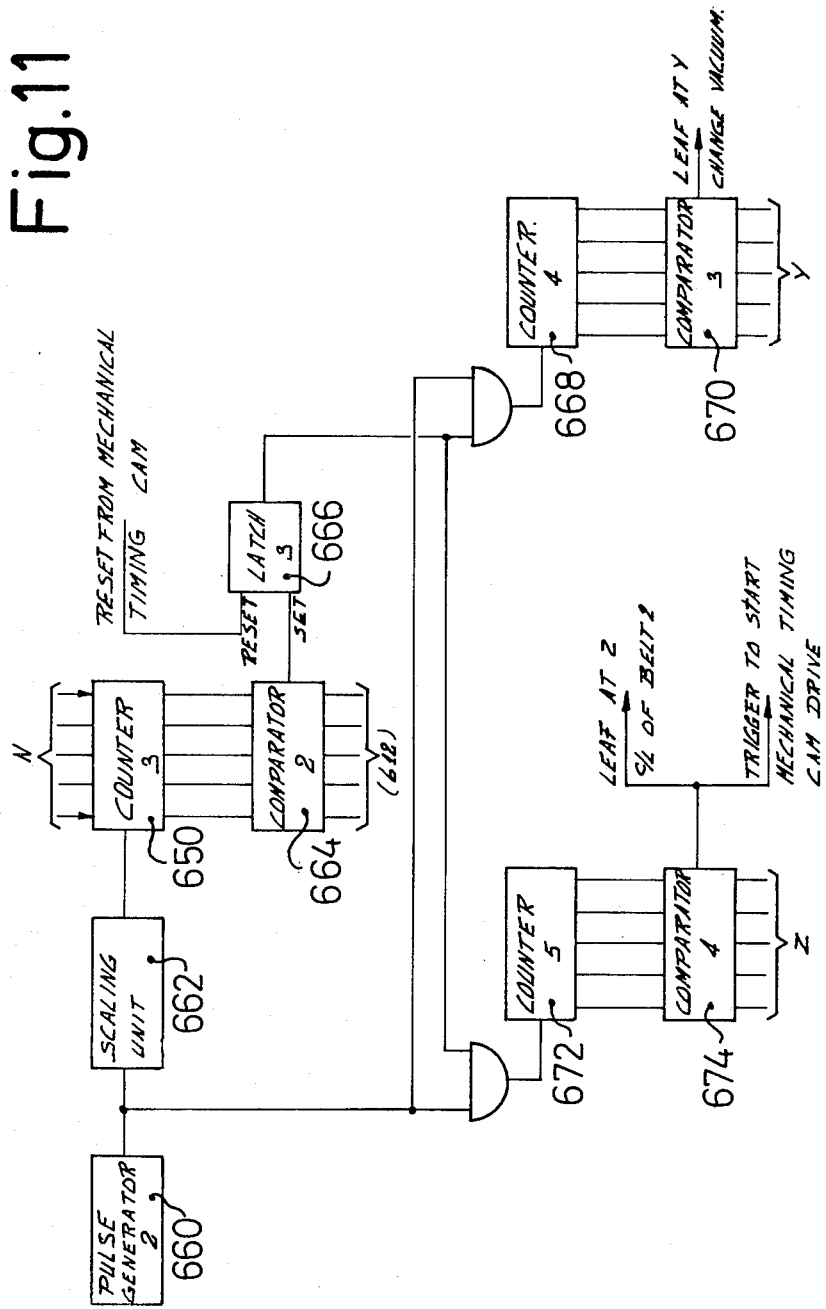

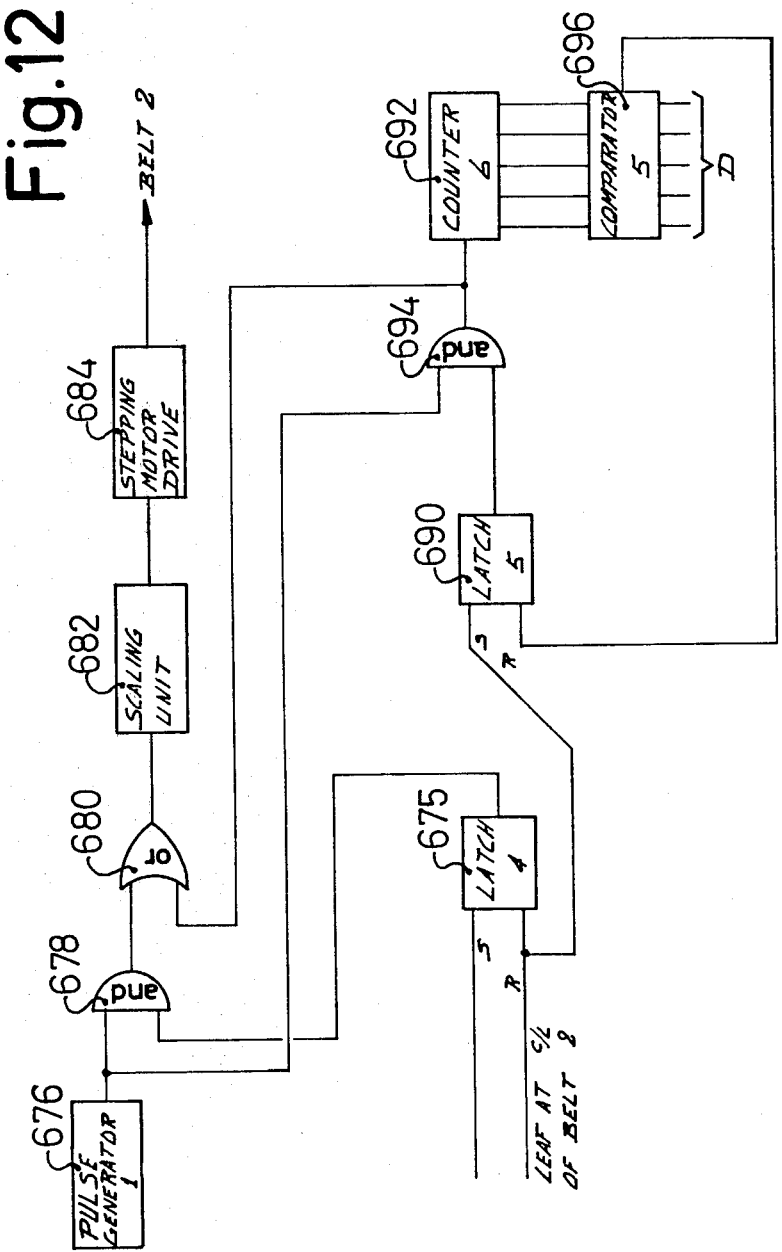

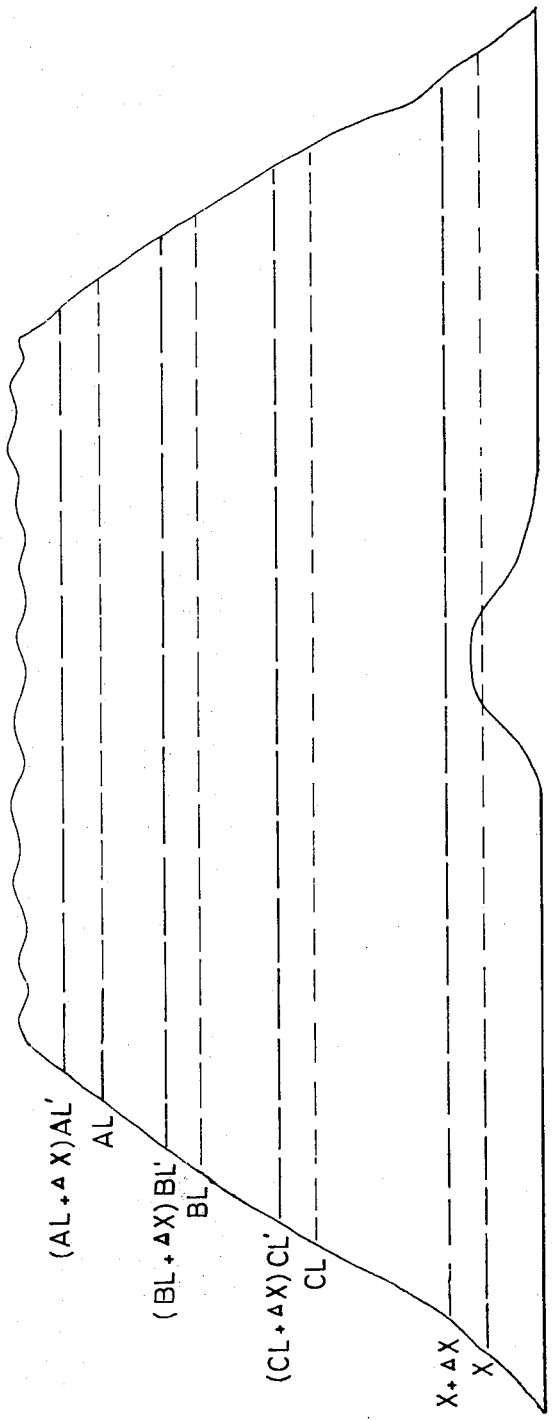

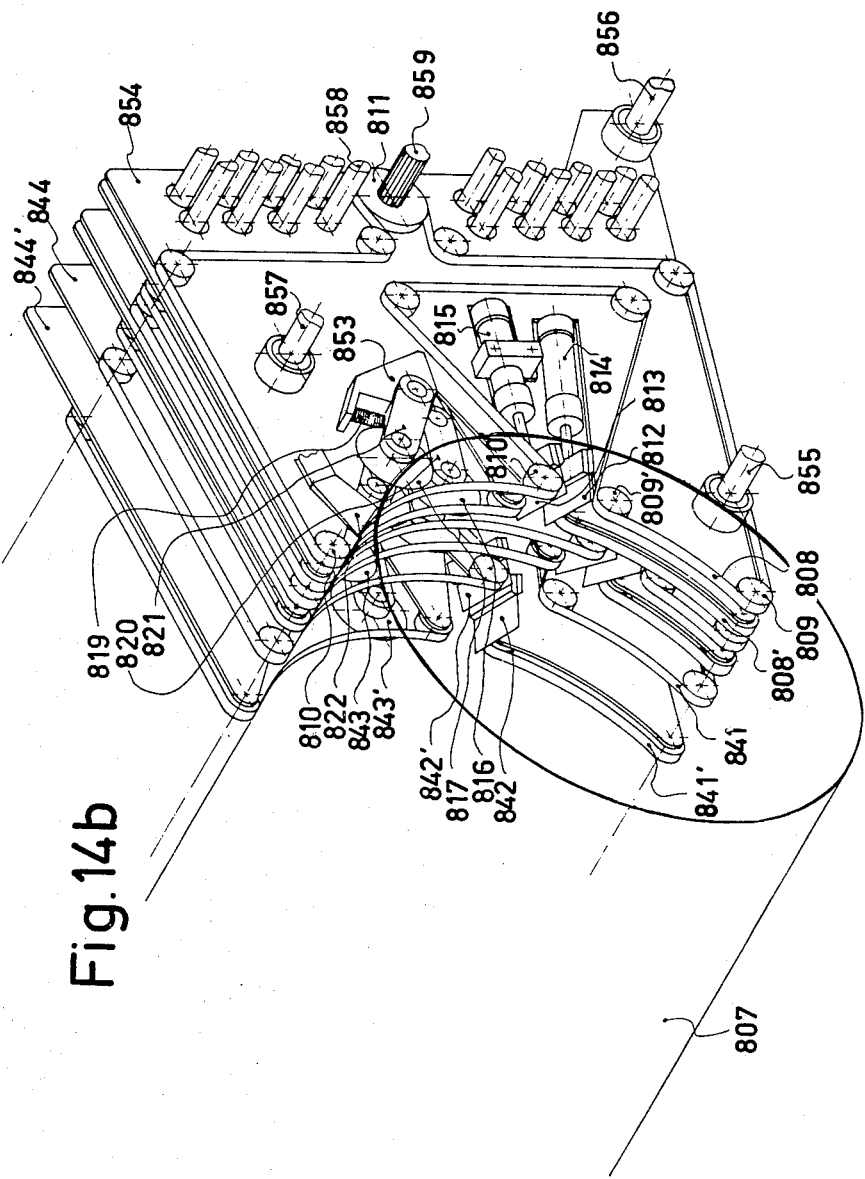

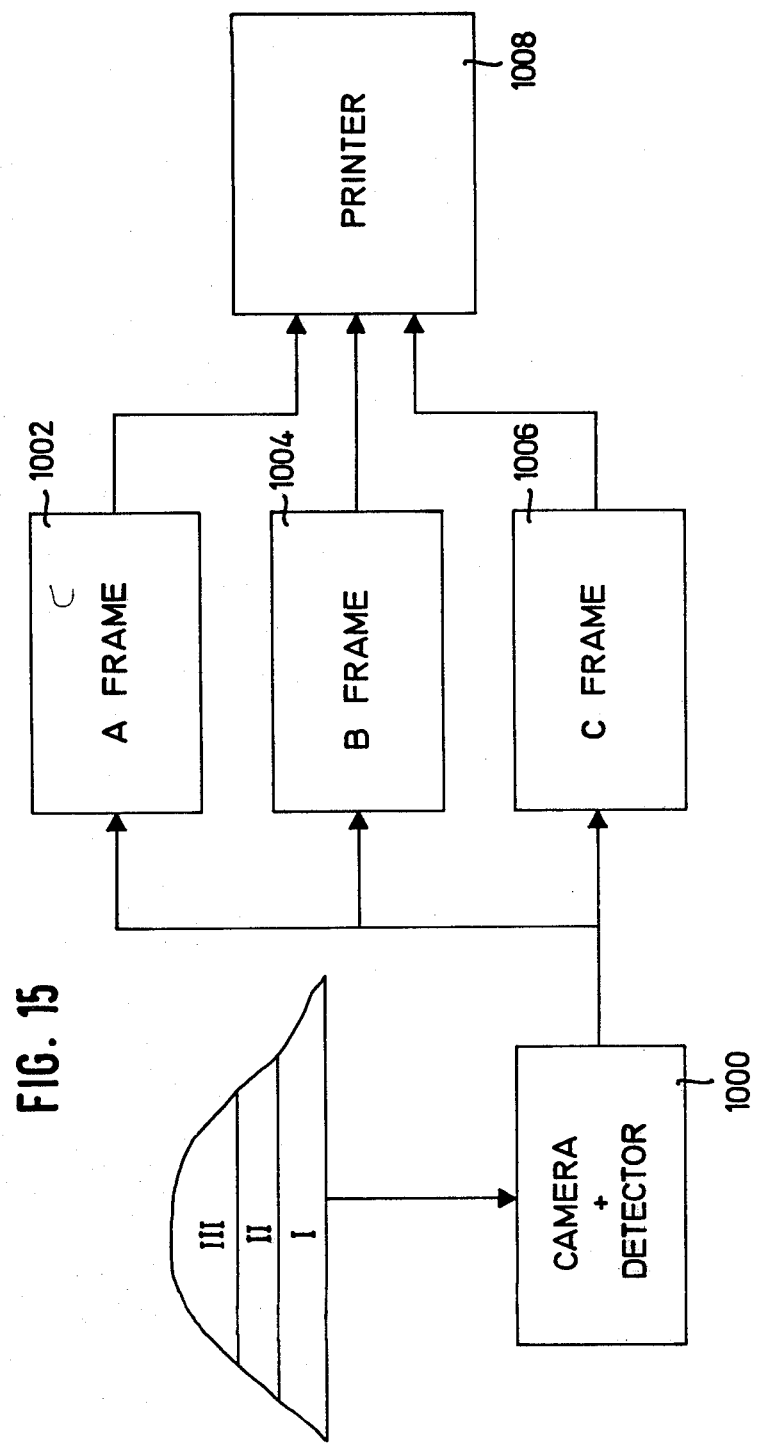

METHOD AND APPARATUS FOR INSPECTING AND CUTTING CIGAR WRAPPERS

This invention relates generally to the production of cigars and particularly to a method and apparatus for automatically inspecting tobacco leaves, to select portions of these leaves which can be used for cigar wrappers and automatically cutting out these portions.

The general characteristics and problems of the production of cigars are well described in the introductory part of U.S. Pat. No. 3,591,044. Reference is made specifically to column 1, and column 2 lines 1-34.

In the production of cigars first a shaped core of tobacco filler is formed. This core is wrapped in a sheet, called the "binder", and then in a second sheet, called the "wrapper". In quality cigars the wrapper at least has to be made from natural tobacco leaf. It is customary to cut it out from the leaf by a die with such a contour that it conforms to the particular shape of the cigar and it has to be wound spiralwise around the core in such a way that the veins protrude at the inside. The wrapper has to be sufficiently free from holes to meet the requirements of the particular cigar quality at issue. Hitherto examination of the leaves for holes has been performed visually. The operator takes a leaf half in his hands, stretches it and inspects it. By experience he learns to judge whether the leaf half contains a portion sufficiently large to cover the whole die which is substantially free from holes. If this is not the case the leaf half is rejected, otherwise he holds the leaf taut across the die in a correct position. This last step again requires considerable experience.

One object of the automation according to the invention is to speed up the production. Another object is to avoid errors by eliminating human interference with the examination of the leaves.

According to the invention there is provided a system for the automatic cutting of portions out of tobacco leaves for cigar wrappers comprising:
optical means for scanning a plurality of discrete areas of said leaf to locate a substantially hole-free and at least one region comprised of a plurality of discrete areas free from holes, said region being of predetermined form to store the location of said hole-free region, and
means for cutting said leaf in accordance with said stored location to produce said portion.

Thus the invention also provides a system for the automatic cutting of portions out of tobacco leaves, these portions being usable for feeding into cigar wrapping machines, comprising the following elements:
(a) means for removing the main vein from the tobacco leaves, producing two leaf halves;
(b) conveyor means for receiving and moving said leaf halves to a scanning location;
(c) optical means at said scanning location for scanning said leaf halves according to a preselected number of frames chosen out of a preselected variety of frames of preselected shape and size, each frame snugly fitting around a preselected number of cigar wrapper shapes, to locate and select a number of regions on said tobacco leaf halves sufficiently free from holes in such a way that optimal coverage of said leaf halves with said regions is obtained according to a preselected priority given to the choice of said regions and to electronically store the location of each of said regions;
(d) a second conveyor means for moving said leaf halves to a cutting location;
(e) cutting means, for cutting out the regions selected by the scanning means mentioned under (c);
(f) means, responsive to the stored locations mentioned under (c), for positioning said regions and said cutting means with regard to one another, in such a way that said regions are cut out when the cutting means mentioned under (e) are actuated;
(g) means for actuating the cutting means under (e) when the right position of the cutting means and the selected regions with regard to one another has been attained.

The term cigar "wrappers" herein is intended to include "binders". Obviously in those cases wherein wrappers and binders are both made of natural tobacco leaf, the process and apparatus as described in this specification can be used for the binders as well (in most cases, however, so called "reconstituted" or "homogenized" tobacco leaf is used for the binders).

Obviously also according to the invention in principle any patch of tobacco leaf which of course preferably does not contain portions of the main vein, could be used instead of actual tobacco leaves.

The removal of the main vein also called midrib—of the whole tobacco leaves is usually called "stemming". It was formerly performed by hand but in modern cigar making factories the universal practice is to feed prepared (humidified) tobacco leaves by hand into a machine, which stretches the leaf to remove creases, after which process the midrib is cut out. A machine which performs these operations will be called a stemming machine. They are commercially available in several types, differing in speed and way of operation. For the stretching process, brushes, air jets, or other means are customarily used, and the coarse midrib is usually cut out by rotating knives. The leaf is held by its stalk and after stretching it is sucked onto a perforated endless conveyor. Examples of such machines or parts of them are described e.g. in U.S. Pat. Nos. 3,759,269, 3,612,067 and 1,486,087, German Offenlegungsschrift No. 1,926,696, Canadian Pat. No. 940,406, German Auslegeschrift No. 2,064,724.

Though in a preferred embodiment of the invention the stemming machine will precede the scanning device, mentioned under (c), this is not absolutely necessary. In principle the order of stemming and scanning device can be reversed.

As will be clear not only during the process of removing the main vein but also during and after the scanning, the tobacco leaf has to be held in flattened out position. This may conveniently be effectuated by suction means for sucking the leaf onto a perforated endless conveyor, such as also used in the stemming machines discussed above. To facilitate the scanning by optical means there should be a sufficient optical difference between the tobacco leaf and the conveyor on which it is stretched. Tobacco leaves having a brown colour it is recommendable that the conveyor surface is brightly coloured, e.g. brightly white.

The meaning of the expression "sufficiently free from holes", occurring under (c) above has to be seen in connection with the quality requirements which have to be met in any particular case. The holes must of course be detectable by the scanning device and this depends on the optical resolution of this device. The more severe the requirements as to the size of the holes which can be permitted, the greater the optical resolution power of the device has to be. Generally it will suffice if the scanning device is able to detect "holes" of which the largest dimension exceeds 1½ mm.

The characteristics of the regions of predetermined size and shape, mentioned above under (c) will be dictated by the size and shape of the wrappers and this in its turn is dependent on the particular size and shape of the cigars for which the wrapper is intended. As in most cases the shape of the wrapper is rather complex and scanning of this complex shape exclusively may unduly complicate the scanning device it is convenient to adapt this scanning device to the scanning of frames which have a simple geometrical configuration. This frame corresponds with the area which has to be "sufficiently free from holes".

Of course the object of the cigar manufacturer is to utilize the tobacco leaf as completely as possible. He may have only one kind of cigar in mind, or several kinds of cigars. According to his manufacturing program, according to the particular size, and, as the case may be according to the quality of the tobacco leaves to which he has access, he will choose the number of frames, according to which he wants to scan, their shape and their size. Each scanning frame, when a simple geometrical figure, may snugly fit around one cigar wrapper shape or around a plurality of these. In a preferred embodiment of the invention the frame has the shape of a parallelogram and in the underfollowing a preferred method will be described by which the scanning of this parallelogram may be performed. In the example of FIG. 1 the scanning frame is a parallelogram fitting around the contour of two wrappers.

When the location of the regions, sufficiently free from holes (which in the underfollowing for reasons of simplicity we may denote as "hole free regions") are established on the leaf halves and electronically stored, the stored locations have to be used to position said regions and cutting devices, in the right way with regard to one other, and, as the case may be, to actuate the cutting device in the right moment.

There is a wide variety of mechanical solutions apparent to one skilled in the art, for the cutting process, but other than mechanical means may also be envisaged. According to known principles in the art of electronics it is then possible to control the positioning and cutting process, once the locations of the acceptable regions are stored electronically.

It is possible to use a cutting die for each of the selected regions, the selected region being cut out in one cut. Also the actual wrapper shape fitting in each selected region may be cut out in one cut by a cutting die with contours of the wrapper.

The cutting may however also be performed with separate knives for the different sides of the selected region, acting simultaneously or in succession. Both general methods—cutting in one cut with a cutting die or cutting with separate knives—will be described in detail by way of example in the under following.

The cut out regions may be directly fed to a cigar wrapping device or be stored in a bobbin in a known manner, properly spaced to be later fed directly to such a cigar wrapping device.

The cutting die, mentioned above, will normally be comprised in any one of the cigar making machines which are well-known in the art. Examples of such machines, in which the cutout wrapper is wrapped around the body of the cigar, or parts of them, are described in U.S. Pat. Nos. 3,152,497, 3,187,756, 3,222,967, 3,225,772 and 3,838,697.

We shall now first describe the invention by way of example for the case that on every leaf half only one parallelogram is scanned and the scanned area is fed to the cutting die of a cigar wrapping machine. First we will dedicate our attention to one particular embodiment of the mechanical part, after which a description will be given how the scanning is performed and how the mechanical part is controlled by the scanning device.

FIGS. 2a and 2b show a perspective view of a first embodiment of the invention;

FIGS. 4a and 4b shows details of part of the first embodiment;

FIGS. 5a and 5b show a leaf carrier of the first embodiment;

FIGS. 6a and 6b show the leaf transporting mechanism of the first embodiment;

FIGS. 7a and 7b show the mechanisms for actuating the rulers of the first embodiment;

FIGS. 8a and 8b show the star shaped discs of the first embodiment and their workings.

FIGS. 9a, 9b, 9c and 9d show details of the gripping mechanism of the embodiment;

FIGS. 10, 10a and 10b show schematics of the control circuitry.

FIG. 11 shows a schematic of a circuit for controlling leaf transfer;

FIG. 12 shows a further circuit for controlling leaf transfer;

FIGS. 13c, 13d, 13e and 13g show leaf sections;

FIGS. 14, 14a, 14b and 14c show the mechanism for cutting in the second embodiment;

FIG. 15 shows a block diagram of a leaf analyzing system.

Figure 1:
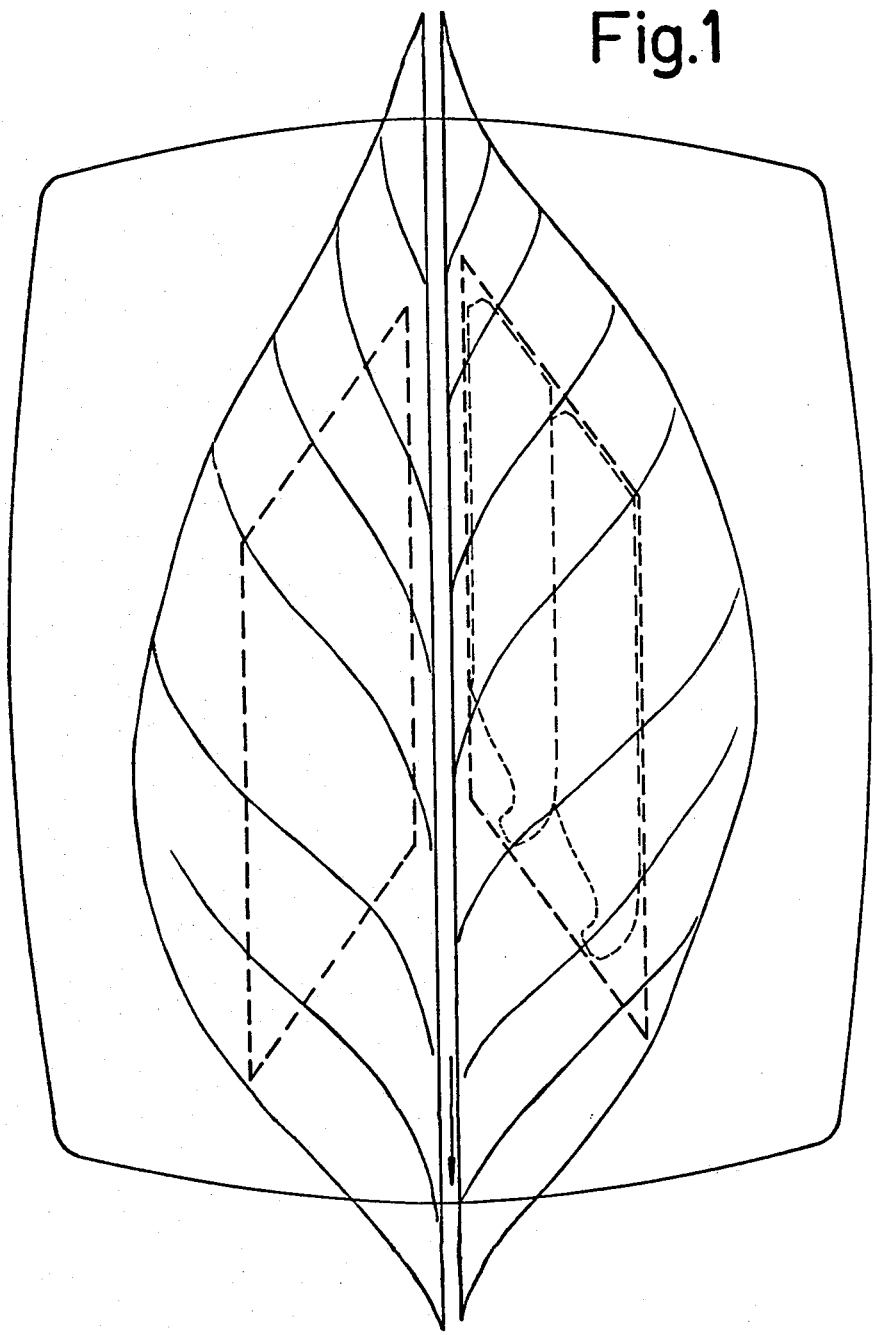
FIG. 1 shows a deveined tobacco leaf with areas from which cigar wrapper portions can be cut.

The main features of the method and apparatus according to the invention will now first briefly be described with reference to the accompanying FIGS. 2a and 2b, showing a perspective view of part of the apparatus, and illustrating the general arrangement of the various elements constituting a particular embodiment of the apparatus.

The whole tobacco leaf is fed in by hand at 1. The main vein is gripped between two narrow endless belts 2 and 2' and the leaf moves to the right. Meanwhile brushes or bristles 3 and 3' attached to the endless narrow belts or strings brush the remainder of the leaf outwards, stretching it and taking out creases. The leaf is then delivered to two endless belts 4 and 4' moving in the direction of the arrow. The main vein of the leaf between these two belts is not cut out by the rotating knives 5 and 5'.

It should be noted that in FIG. 2, for practical reason, in connection with the space available for the drawing, the same belts are used for stemming and for scanning. In a preferred embodiment of the invention, however, to be described hereinafter, the stemming machine is a separate entity, and the leaf halves are transferred from the belts of the stemming machine to the belts on which scanning is performed by an intermediate endless belt.

At 6 there is shown a scanning device, which will be described in more detail hereinafter. As soon as the leaf is in the right position below this scanning device its presence is detected and the belt stopped, scanning is then performed. Belts 4 and 4' are made of porous material (or have numerous perforations) and the leaf halves are firmly held onto their surface by applying vacuum in the space 7 of a vacuum chamber below the upper surface of each belt.

Scanning being completed, belts 4 and 4' start moving again. If on a particular leaf half the prescribed area sufficiently free from holes has not been found, the belt on which this leaf is situated moves on and delivers it to a "booking" apparatus 9, which "books" the leaf on a roll 8. If on the other hand a prescribed area sufficiently free from holes has been located on the leaf half the belt moves on and the leaf half is transferred to another belt as will be described below. The transfer takes place after the first belt has moved for such a distance that ultimately the selected area is in the right position to be transported to the die. For this to occur a predetermined point of the selected area—say the middle of the base line of a selected parallelogram—has to be in such a position that it ultimately coincides with a predetermined point of a leaf carrier (to be described below), when the leaf half is gripped by that carrier—say the middle of the edge of the carrier gripping the leaf half.

A transfer device 10 serves to transfer the leaf half to the leaf carrier. It consists essentially of an endless belt 11; vacuum can be applied to the space enclosed by that belt. When the leaf half arrives transfer device 10 is in horizontal position and its belt 11 is so close to belt 4 that there is just sufficient room for the leaf half to pass between these two belts. Belt 11 moves in the direction of the arrow at the same velocity as belt 4 and vacuum is switched from 4 to 11 when a predetermined point of the scanned and accepted parallelogram has arrived at a predetermined point of belt 11. The leaf half will thus be taken over from belt 4 to belt 11. Device 10 is now "flipped over" through 90° as shown by the arrows 12 and 12'. Belt 11 now goes on running and is stopped when after the transfer it has run for half its total length. The scanned parallelogram on the leaf half is then exactly on the opposite side.

The leaf half is now gripped by a carrier which arrives, (not shown), hanging between endless chains 13 and 13' moving in the direction of the arrows. The carrier is manipulated by several mechanisms, which will be discussed in detail hereinafter. At least it will be hanging between jaws 14 and 14' and "delivered" hanging between endless chains 15 and 15', moving in the direction of the arrow 16. Several leaf carriers will "queue up" at 17. They will be picked up one by one by jaws 18 and 18' and delivered to gripping mechanisms 19 and 19' of revolving star-shaped discs 20 and 20'. These discs will deliver each leaf half to the cutting die by opening the carrier and releasing the leaf half at the right moment. Each empty carrier is delivered by the star-shaped disc to beaks 21 and 21', which in turn deliver it onto chains 13 and 13' for it to be transported back and used again. All this will be discussed in more detail below.

It is obvious that for processing the leaf half lying on belt 4' the apparatus additionally comprises components which are arranged as a mirror image of the components described above from 10 and 10' through 21 and 21'. For this reference is made to FIG. 3 which is a top view of the arrangement. At 6 again the scanner is shown, with endless belts 4 and 4'. At 10 and 10' are shown the mechanisms described above for transferring the leaf halves from belts 4 and 4' to the respective leaf carriers (not shown here). The endless chains to which the leaf carriers are delivered are shown at 15, 15', 15" and 15'''. Wrapping machines are shown at 22 and 22' and cutting dies are designated by 23 and 23'.

There will now follow a more detailed description of the various components of the apparatus, briefly described above. For particulars of the stemming machine reference is made to U.S. Pat. No. 3,515,149.

FIG. 4a) is a top view of the first part of the apparatus, and FIG. 4b) is a cross-section taken on the line 4b-4b'.

Reference numeral 101 denotes the last part of the belts of the stemming machine. At 102 is shown an endless belt. In the space within that belt is a vacuum chamber 103. Belt 102 runs in the direction of the arrow at the same speed as the belts of the stemming machine, and transfers the two leaf halves to a belt 104, provided with a vacuum chamber. Belt 104 is made of light-coloured fiber-reinforced synthetic plastics material, perforated with holes of 0.8 mm diameter, spaced apart a distance of 5 mm. The scanning apparatus is shown at 106. At 107 and 107' the transfer mechanisms to transfer leaf halves from belts 104 and 104' to the leaf carriers mentioned previously, are shown. The endless belts of the transfer mechanism are actuated by stepping motors 129 and 129' which are shown in FIG. 4a and will be mentioned below. At 108 there is a partition, which separates the one vacuum chamber 105 (for both belts 104 and 104') from the two separate vacuum chambers for the belts 104 and 104' to the right of 108. A vacuum pump 109 applies vacuum to chamber 103 through a duct 110 and to chamber 105 through a duct 111. Vacuum is applied to vacuum chambers 112 through a duct 113, while the vacuum chamber inside 107, designated by 114, is served through flexible corrugated tubes 115 and 115'. By manipulating the slide 116 vacuum can be switched from 113 to 115. This switching coincides with the moment at which a leaf half is taken over from a lower conveyor belt to the transfer mechanism (i.e. from 104 to 107, which has to deliver it to the leaf carrier, as previously mentioned. Slide 116 is actuated by a pneumatic device 117, which in turn is served by an electro-pneumatic valve 118, connected with a source 119 of pressurized air.

As previously described when an area of predetermined size and shape has not been found on a leaf half this leaf half is rejected. This means that it is not transferred to the leaf carrier, but stays on the lower belt to be "booked" by a mechanism shown at the right of FIG. 4a) and 4b) at 120. This mechanism is described in German Auslegeschrift No. 2,064,724. The mechanism is started as soon as a photo-electric cell 121 senses the presence of a leaf half on the lower belt 104. A motor 122 is working continuously. It drives belts 104 and 104' through the intermediary of an electric clutch and brake device 123. Device 123 is used to drive belts 104 and 104' and to stop these when scanning has to be performed. It is provided with an electric pulse generator 124, working continuously and another such generator 125, in action only when 123 is in clutch position. Pulse generators 124 and 125 are used for the electronic control which will be discussed hereinafter. Another electric clutch and brake mechanism is shown at 126 and cooperates with photo-electric cell 121 to actuate the booking mechanism 120. The rejected leaf halves are rolled onto a drum 127.

FIG. 5a) is a front view of the leaf carrier with a small section cut out for the sake of clarity, and FIG. 5b) is a side view thereof. The carrier comprises essentially a clamp, consisting of a main body 201 cooperating with a movable part 202 on a axle 203, rotatable in the main body 201. The clamp is held in closed position by springs 204 and 204' and can be opened by actuating a lever 205. A shaft through the upper part of the main body and its bearing are shown respectively at 207 and 208. The shaft is provided at both ends with fixed sprocket wheels 209 and 209' which cooperate with the endless chains which transport the carriers to and from the cutting die. The shaft is also provided with small smooth wheels 210 and 210' mounted with bearings to run freely on the shaft. These wheels cooperate with smooth rails, parallel to the endless transporting chains and have the function to prevent jolting when the carriers queue up (cf. FIG. 2 reference numeral 17) and the chains go on running. The main body of a carrier is provided at each end with a body 211 and 211' of prismatic shape to be gripped and transported, as will be described below.

Figure 6B:
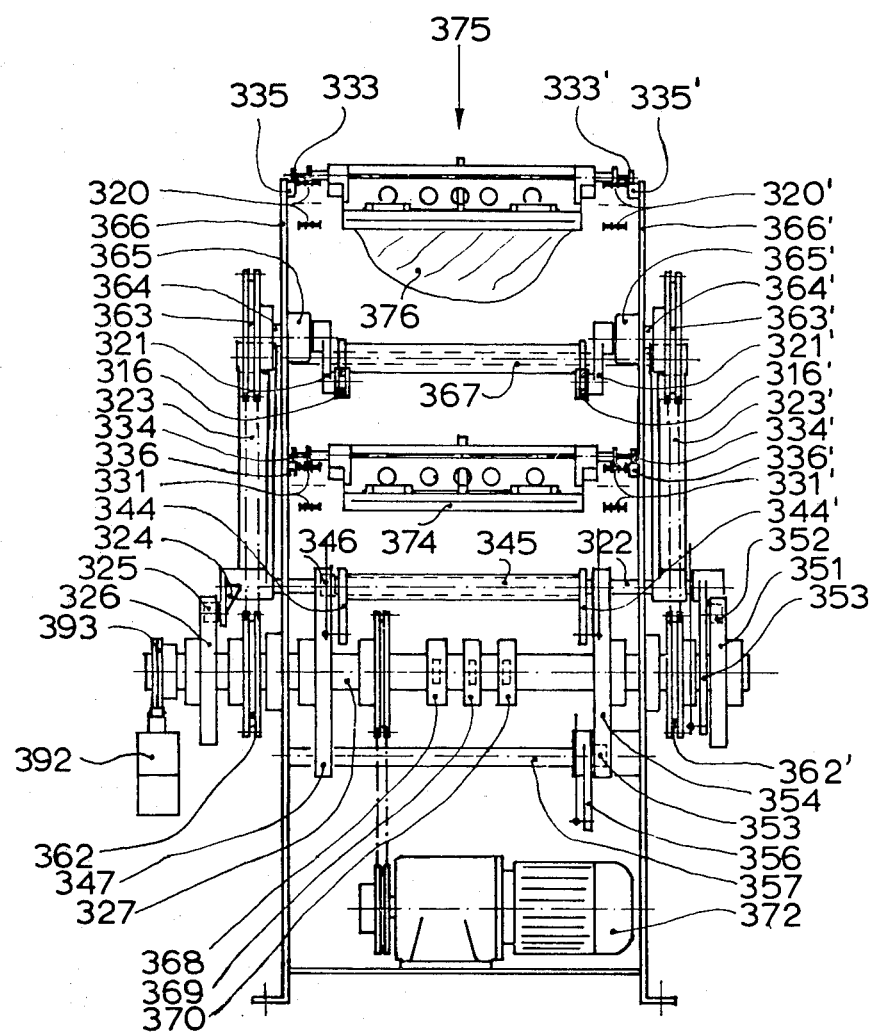

FIG. 6a is a side-view of part of the mechanism for transporting the leaf carrier, and FIG. 6b is a cross-section along the line 6b-6b' in FIG. 6a. At 301 is shown the mechanism which transports the leaf half from the lower belt on which the scanning is performed to the leaf carrier. This mechanism has already been discussed above and is shown at 10 in FIGS. 2 and 3 and at 107 in FIGS. 4a and 4b.

At 302 is shown a leaf carrier gripped in the two fork shaped ends of levers 303. At 304 is shown an axle which at both ends rests in bearings in the frame of the apparatus. Mounted on this axle a pressing lever 305 and a forked lever 306. Lever 305 presses the carrier into the forked ends of 303 in order to fix the main body of the carrier. Lever 306 is rotatably attached to a block 307, which slides along a rod 308 and is pressed downwards by a spring 309. The end of rod 308 presses at 310 on lever 311 which opens the clamp of the carrier, as has already been discussed above (see FIGS. 5a, 5b, reference numeral 205).

When a leaf half sucked onto the belt of transfer mechanism 301 is presented a ruler attached to that mechanism is retracted, so as to make available a narrow strip of the leaf half all along its straight side, which strip can be gripped by the clamp of the leaf carrier. In this connection reference is made to FIG. 2, reference numeral 22 and to FIGS. 4a and 4b, reference numerals 128 and 128'. The mechanism for actuating the rulers will be described in more detail with reference to FIG. 7. Now again referring to FIG. 6a, we see a rod 312. At 313 is shown an axle resting at both ends in bearings in the frame of the apparatus. Mounted for rotation on this axle are two levers 314 and 315 fixedly attached to each other. By pushing the rod 312 the levers 314 and 315 will turn clockwise as indicated by the arrow. The rod 308 glides through the block 307 by the action of the spring 309 which at its upper end is attached to the upper end of the rod. The pressure of 308 on the lever 311 of the carrier is released and the clamp of the carrier closes by its own closing springs as already discussed above (see FIG. 5a reference numeral 204 and 204'). When the rod 308 continues its movement upwards the block 307 is pushed upwards and the levers 306 and 305 swivel clockwise around with the axle 304. The grip on the leaf carrier is thus released and it can be lifted by the two levers 316 and 316'. Moving forward and upward the forked ends ("beaks") of these levers 317 grip the prismatic bodies 302 of the leaf carrier and lift it along a path, which is indicated by the line 318. At the point 319 the carrier (loaded with a leaf half) is deposited on the endless chains 320 and 320' (see also FIG. 2, reference numerals 15 and 15').

The vertical movement of the levers 316 and 316' is dicated by the rotation of the cranks 321 and 321'. The levers 316 and 316' are connected by the hollow axle 367. The horizontal movement of said levers is brought about by the following arrangement. At 322 we see a rotatable axle, resting at both its ends in bearings in the frame of the apparatus. This axle 322 carries, fixedly attached to it, the levers 323, 323', 324. At the one end of 324 there is a roll 325 moving within the excentric groove of the disc 326. This disc is attached to the rotatable shaft 327, resting at both ends in bearings in the frame of the apparatus. To take care that the beaks 317 and 317' remain always in vertical position they are hinged in the levers 316 and 316' at 328. Steel wires are attached to the beaks and to the lever 329 to this purpose. The lever 329 moves in a frame 330, which is fixedly attached to the frame of the apparatus.

Above we have indicated that the forked ends of the levers 317 grip the prismatic bodies 302 of the leaf carrier and lift it up. By then the levers 303 start a downward movement, following a path of such curvature that it avoids collision with the last empty leaf carrier of the stock of empty leaf carriers which are queuing up on the lower endless chain 331. This last leaf carrier is indicated at 332.

Previously when discussing FIG. 5a and FIG. 5b we mentioned that in order to prevent jolting when the leaf carriers are queuing up a small wheel indicated with 210 and 210' cooperate with a smooth rail parallel to the endless transport chains. In FIG. 6b now we see the small wheel at 333 and 333' and also 334 and 334'. The rails are indicated at 335, 335', 336 and 336'. The queuing up is accomplished by having the rails curving up at their ends so that the forward movement of the small wheels just mentioned are stopped dead.

The curved path of the lever 303 at its downward movement, which has been mentioned above, is brought about by the following arrangement. The lever 303 (and the corresponding lever which lies behind it, and cannot be seen on the drawing of FIG. 6a) is fixedly attached to the lever 337 which at its end carries a roll 338, cooperating with the curved groove 339 in the fixed frame 340. The combination 303-337 swivels around the axle 341. This axle is fixedly attached to a block 342 (and its counterpart which lies behind it, and cannot be seen on the drawing). The block 342 (respectively its counterpart) is slidable on a rod 343 (respectively its counterpart) up and down as indicated by the arrows. The block 342 (respectively its counterpart) derives its motion from the lever 344, respectively its counterpart 344', to be seen in FIG. 6b; 344 and 344' being connected by the hollow axle 345, to be seen in FIG. 6b. The hollow axle 345 can swivel around the axle 322, already mentioned. This swiveling action is dictated by the roll 346 attached to the lever 344, the roll moving in an excentric groove of the disc 347, attached to the shaft 327, previously mentioned. The movement of 344 is communicated to the block 342 by the rod 348.

The roll 338 moves downward in the groove 339 along the "tongue" 349, swiveling around a small axle. In the upward movement of the roll 338 it presses against the right side of said tongue 349. This tongue is pressed to the right by a spring (not shown) so that when the roll 338 moves downwards it does not constitute an impediment to the movement of the roll.

On the shaft 327 there is attached a disc 351 in FIG. 6b, with an excentric groove, cooperating with a roll 352, mounted on the lever 353, hinging around the axle 322. The movement of 353 is passed on to the rod 312, to actuate the levers 314 and 315, for opening the clamp of the leaf carrier, as already extensively described above.

On the shaft 327 is also attached a disc 354, with an excentric groove, cooperating with a roll 355, mounted on the lever 356, hinging around the axle 357, fixedly attached in the frame of the apparatus. The movement of lever 356 is communicated to the lever 358, by the rod 359. The lever 358 is connected to frame 360 of the transfer mechanism 301, the function of which has been extensively discussed above. The movement of the transfer mechanism 301 as shown by the arrows, is accomplished by 358 swiveling around the axle 360, which is fixed to the part 361 of the frame of the apparatus.

The shaft 327 carries also the toothed wheel 362 and 362', which by chains cooperate with the toothed wheels 363 and 363'. The wheels 363 and 363' are mounted on shafts 364 and 364', rotatable in bearings 365 and 365' in the frame 366 and 366' of the apparatus. At the shafts 364 and 364' there are attached cranks 321 and 321', cooperating with the levers 316 and 316', as previously described.

It is obvious that by the arrangement which has just been described synchronization is obtained between the process steps governed by the shaft 327 and the process steps governed by the levers 316 and 316'.

The shaft 327 carries also metal rings clamped around it 368, 369 and 370, carrying "vanes" (indicated with dotted contours). The vanes cooperate with proximity switches, of which one is shown at 371 in FIG. 6a. These proximity switches are part of the electronic control system, serving to integrate the working of all parts of the apparatus. The axle 327 is actuated by the electric motor 372, which in its turn is governed by the electronic control system, to be more fully described below.

At 373 we see another proximity switch serving to indicate whether or not an empty leaf carrier is available.

In the foregoing we mentioned the "ruler" on the transfer mechanism 301 which at the appropriate moment is withdrawn to set free a narrow strip of the leaf half, to be gripped by the clamp 374 of the leaf carrier. At 375 is shown a leaf carrier, carrying a leaf half 376.

The mechanism to actuate the "ruler" just mentioned will now be described with the help of the FIGS. 7a and 7b. FIG. 7a is a side-view of the transfer mechanism which in FIG. 6a was denoted with 301, while FIG. 7b is a cross-section along the line 7b-7b' in FIG. 7a. At 377 and 378 we see the drums for the endless conveyor 379, the stepping motor driving one of the drums is shown at 380. This stepping motor in its turn is governed by pulses of the electronic control circuit.

The "ruler" is shown at 381. This ruler is hinged at 382 and 382' to levers 383 and 383', which are attached to the axles 384 and 384'. These axles are rotatably attached to the side frames 385 and 385'. The axles 384 and 384' are connected through the levers 386, 386' and 387. To the axle 384' there is connected a lever 388, connected to the plunger 389 of the pneumatic device 390, hingable attached at 391 to the frame 385'. The pneumatic cylinder 390 is serviced by pressurized air from the mechanical-pneumatic valve 392. The valve is actuated by the excentric disc 393 mounted on the shaft 327. For 327, 392 and 393 we also refer to the FIGS. 6a and 6b.

Figure 3:
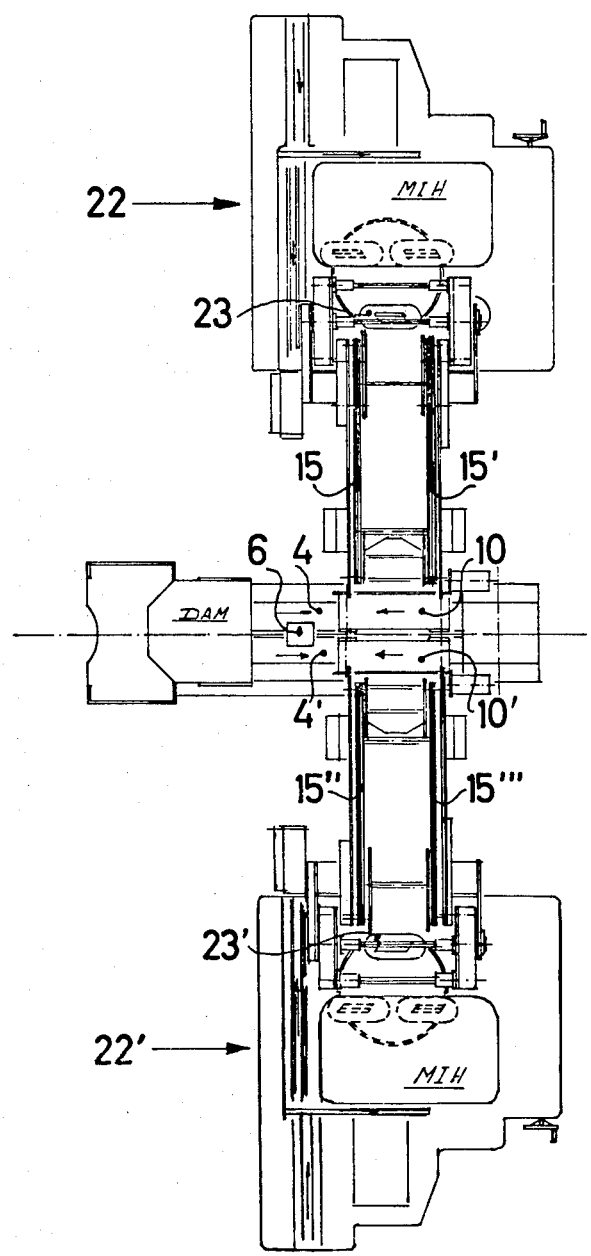
FIG. 3 shows a top view of the first embodiment.
Figure 8B:
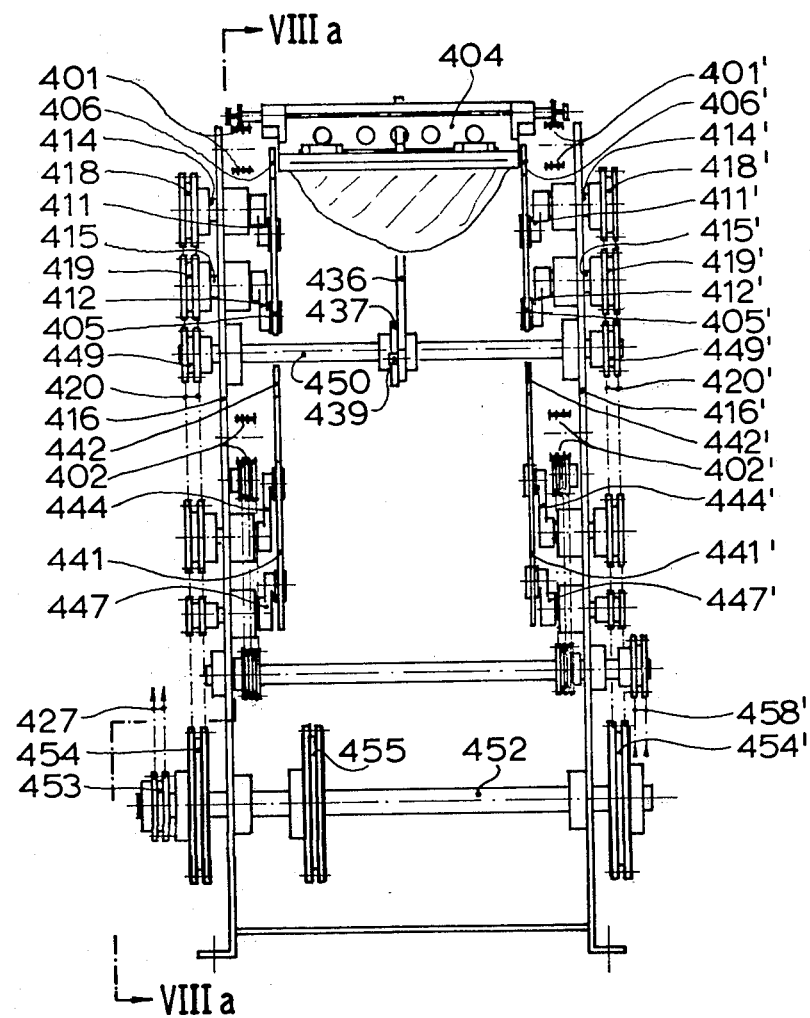

The FIGS. 8a and 8b serve to clarify the working of the star shaped discs and their appurtenances, which serve to take over the loaded leaf carriers from the endless chains, and release the leaf halves at the appropriate moment above the cutting die, all of which were mentioned when discussing FIGS. 2 and 3. FIG. 8a is a cross-section according to the line VIIIa-VIIIa' in FIG. 8b, while FIG. 8b is a cross-section according to the line VIIIb-VIIIb' in FIG. 8a. For the sake of simplicity in this cross-section we have not shown the star shaped discs.

An upper endless conveyor chain is shown at 401 while a lower conveyor chain is to be seen at 402. The leaf carriers are queuing up at 403 in the manner which has already been described.

The leaf carrier 404 at the end of the queue has to be transferred from the endless chains 401 and 401' to the gripping mechanism on the star shaped discs, which in FIG. 2b were denoted respectively with 19, 19' and 20, 20'. This gripping mechanism will be more fully discussed below.

The transfer of the leaf carrier from the endless chains 401, 401' to this gripping mechanism is accomplished by the operation of the triangular plates 405, 405', with the "beaks" 406, 406'. Each triangular plate is provided with two horizontal slots 407 and 408 and with a vertical slot 409, cooperating respectively with the cranks 410, 410', 411, 411' and 412, 412'.

The arms of the cranks 410, 410' and 411, 411' have the same length while the arm of the crank 412, 412' has nearly twice that length. The just mentioned cranks are attached to short shafts 413, 413', 414, 414' and 415, 415', rotatable in bearings in the frame 416, 416' of the apparatus. All these shafts rotate with the same speed. This is accomplished by identical toothed wheels attached to every shaft 417, 417', 418, 418', 419, 419'. The toothed wheels cooperate with an endless chain 420, 420'. By the rotation of the cranks the triangular shaped discs 405, 405' and the beaks 406, 406' move according to an ellipse with a short axis in vertical direction twice the arm length of the cranks 410, 410' and 411, 411' and a long axis in horizontal direction twice the arm length of the crank 412, 412'. In making this movement the beaks 406, 406' pick up the leaf carrier 404 by the prismatic bodies, which have been extensively discussed above (FIGS. 5 and 5a, numerals 211 and 211').

The arrows 421 and 422 indicate the path followed by the leaf carrier. At the point 423 were these arrows intersect the leaf carrier is transferred from the beaks 406, 406' to the gripping mechanism of the star shaped discs 424. These discs are mounted on a shaft 425, provided with a toothed wheel 426, cooperating with an endless chain 427. Each star shaped disc is provided with four planet pinions, which we see at 428, 429, 430 and 431. Each planet pinion is freely rotatable around short axles attached to the star shaped discs. The planet pinions lock in with toothed wheels 432 which are fixed to the frame 416, 416', and also at the opposite side to the toothed wheels 433 fixed to short shafts attached to the gripping mechanism for the leaf carrier and revolving in the star shaped discs. This arrangement ensures that on rotation of the star shaped discs the leaf carriers will remain in vertical position, when care is taken that the fixed toothed wheel 432 is exactly as large as the toothed wheels 433.

When a leaf carrier arrives above the cutting die 434 the leaf is sucked on to this die by the vacuum around and within the contours of that die and is stretched tautly across this die. The clamp of the leaf carrier has to be opened on the moment when the selected area of the leaf coincides with the bounderies of the cutting die. This is accomplished by the small lever 435, cooperating with the lever of the clamp of the leaf carrier which in FIG. 5a and 5b was denoted with 205.

This small lever 435 is attached to a big lever 436, which makes a to and fro movement in the direction of the arrows. This movement is accomplished by the rotation of an excentre 437 with a slot within 436 and two rolls 438 and 439.

Now we have to describe what happens to the leaf carrier after it has delivered its leaf half to the die. By the rotation of the star shaped discs it will move on in the direction of the arrow 440 to be transferred to the lower chains 402. This is accomplished by a transfer mechanism consisting of two triangular plates 441, 441' with beaks 442, 442'. The movement of each of the triangular plates is governed by the rotation of the cranks 443, 443' and 444, 444' in horizontal slots 445 and 446, furthermore the crank 447, 447' in the vertical slot 448. The cranks arms 443, 443' and 444, 444' are twice as long as the crank arm of 447, 447'. The first mentioned two rotating in a direction opposite to that of the last one. Crank 447, 447' has a rotational speed twice that of the cranks 443, 443' and 444, 444'. All these cranks derive their movement from the endless chain 420, previously described when discussing the movement of the plates 405, 405'. This chain 420 also actuates the toothed wheel 449, 449' mounted on the shaft 450, for the movement of the lever 436.

By the combined action of the cranks 443, 443'; 444, 444' and 447, 447' the beak 442, 442' describes an "eight" shaped path, the upper part of which is indicated by the arrow 451. At the point where the arrows 440 and 451 intersect the leaf carrier is taken over from the gripping mechanism of the star shaped discs 424 and consecutively deposited on the chain 402, 402'.

All the mechanisms served by the endless chains 420, 420' and 427 are ultimately actuated by the shaft 452, provided with toothed wheels 453 and 454, 454'. The toothed wheel 455 connected with the shaft 452 is actuated by the cahin 456, which in its turn derives its movement from the main shaft of the wrapping machine (MIH), in order to synchronize this wrapping machine with the apparatus according to the invention.

The electric motor 457 actuates through the chain 458 the upper and lower transport chains 401 and 402, which move continuously.

In the foregoing it has already been mentioned that the leaf carrier denoted with 404 in the FIGS. 8a and 8b at the end of the queue of leaf carriers on the endless chains 401 and 401' has to be transferred from these chains to the gripping mechanism on the star shaped discs, one of which in FIG. 8a was denoted with 424.

This gripping mechanism was shown in FIG. 2b and denoted with 19, 19'. Details of it will be now described below, referring to FIGS. 9a, 9b, 9c and 9d.

The gripping mechanism consists of two parts between which the leaf carrier is gripped. In the figures just mentioned one part is shown. This part cooperates with the other, which is its mirror image, in exactly opposite position. FIG. 9a is a front view while FIG. 9b is a cross-section, both in closed position. FIG. 9c is a front view in opened position and FIG. 9d is the corresponding cross-section.

At 501 we see the star shaped disc, previously mentioned repeatedly, which is provided with a housing 502 for the bearing 503. In this bearing a shaft 504 is shown. The shaft 504 is provided with a toothed wheel 505, which in FIG. 8a was denoted with 433 and which as previously described, cooperates with the planet wheel 506. This planet wheel was denoted with 428 in FIG. 8a. The body of the gripping mechanism is shown as 507 and is fixed to the shaft 504. Above it has already been explained that while the star shaped disc 501 revolves the gripping mechanism remains in "vertical" position (meaning that the leaf in the leaf carrier gripped by the mechanism in question will remain hanging down in its totality) by the interplay of the toothed wheel 505 with the planet wheel 506.

A ring 508 fits around the housing 502, which, as said, is fixed to the star shaped disc 501. The position of this ring can be adjusted by turning it. The slot 509 makes this adjustment possible, while the screw 510 fixes the position.

Part of the ring which we denote with 511 varies in thickness taken in axial direction so that we can distinguish between a "thick" and a "thin" part which we denote respectively with 512 and 513. These parts are connected by the "sloping" part 514.

In the body 507 of the gripping mechanism there is an axle 515, to which a lever 516 is attached carrying a roll 517, cooperating with the part 511 of the ring. The axle 515 also carries a lever 518, to which a spring 519 is attached. This spring 519 working through the lever 518, the axle 515 and the lever 516, assures that the roll 517 is always pressed against the ring 511. Rotation of the star shaped disc 501 will result in a rotation of the ring 511 around the shaft 504 and as the body 507 of the gripping mechanism is attached to the shaft 504 the roll 517 will follow the end surface of the ring 511.

When the gripping mechanism is in "closed" position, as depicted in FIGS. 9a and 9b the roll 517 will rest against the "thin" part 513 of the ring 511. When, on the other hand the gripping mechanism is in "open" position, as depicted in 9c and 9d the roll 517 will rest against the "thick" part 512 of the ring 511.

The body 507 of the gripping mechanism is also provided with an axle 520, to which a lever 521 is attached. This lever 521 is linked to the lever 518 by a chain link 522. By the movement of the lever 518, the lever 521 will hinge around with the axle 520, opening and closing the clamp 523. In closed position the axle 515 and the pins of the chain link 522 will lie in a straight line, as shown in FIG. 9b. In closed position the small smooth wheel 524 of the leaf carrier—which in FIGS. 5a and 5b was denoted with 210—is firmly held between the clamp 523 and the body of the gripping mechanism 507.

As previously described the main body of the leaf carrier 525—which in FIGS. 5a and 5b was denoted with 201—"freewheels" with regard to the small smooth wheel 524. Thus to keep the main body of the leaf carrier always in "vertical" position the prismatic body 526—which in the FIGS. 5a and 5b was denoted with 211—will be taken up in a groove 527 in the main body of the gripping mechanism 507 of corresponding shape.

Coming back to FIGS. 8a and 8b, the leaf carrier is taken over from the beaks 406 and 406' to the gripping mechanism. On that moment the clamp 523 is open as shown in FIGS. 9c and 9d. When the gripping mechanism has arrived at the point 423 of FIG. 8a the clamp begins to close and is fully closed after a revolution of 15° of the star shaped disc. The gripping mechanism remains closed while the star shaped disc continues its revolution and begins to open, 15° before the point where the beaks 442 and 442' of FIGS. 8a and 8b take over the (then empty) leaf carrier from the gripping mechanism. At that point the clamp 523 of FIG. 9c is again fully open. It stays open till the point 423 of FIG. 8a is reached, and the cycle starts all over again.

The optical means, comprised in the scanning system preferably includes a television camera for producing a video output by scanning a plurality of lines in a scanning direction parallel to the stem of the leaf, means for deriving either from said video output or independently two reference signals, means for comparing each reference signal with said video signal and producing a binary '1' level when said reference level exceeds said video output level, means for sequentially storing said first and second binary signals received at an input and for providing the stored signals at an output. Logic means connected to first binary signal such that this signal is only allowed to pass during the period of a gating logic signal, this gating signal being such that it is full picture height but only very short horizontal width, also is such that it's horizontal position within the television frame can be varied. The signal resulting from the AND gate combination of the first binary signal and the gating logic signal is passed to a counter which is re-set at the end of each frame, therefore, this counter continuously monitors the height of any detected feature crossing said gating logic frame signal. Connected to the output of this counter are two comparator means which are capable of comparing the number held in the counter with two preset numbers set in via separate controls and giving a logic output indicative of whether or not the number in the counter is greater than or less than the preset number. One preset number is greater than the other and a logic latch is connected to the said comparators such that when the said counter number exceeds the greater preset number said latch is set to logic '1' state and that when said counter number is less than the smaller preset number said latch is reset to a logic '0' state. Said latch output is connected to a second latch system which is set upon the output of the first latch being set to a logic '1' and is reset after a given period has elapsed, this elapsed period being timed via an electronic monostabel circuit. A second monostable timing circuit is activated from the latch being set and this is of a shorter duration than the first monostable timing circuit and is so arranged that at the end of its period the scanning system is initiated to measure the leaf. The circuitry to measure the leaf comprises logic means having an input connected to said storing and providing means output and to said comparing and producing means and an output to said storing and providing means for applying binary signals to said input to produce a stored signal in said storing and providing means representing superimposed lines and indicating the location of holes at each point of each of said lines along said scanning direction, and means for determining, at the end of scanning, whether said stored signal indicates at least one hole-free area.

The storing and providing means of the optical system may conveniently include a digital shift register, and the logic means may include an AND gate and a data selector connected between said AND gate and the output of the storing and providing means for delaying the binary signals applied from the output of the storing and providing means so as to produce a parallelogram shaped hole-free region.

The means for determining, at the end of the scanning, whether the stored signal indicates at least one hole-free area may include a counter having a reset input and a count input, a gate connecting said data selector to said reset input for resetting said counter whenever a binary signal indicating a hole is applied, and second logic means for applying the stored binary signals to said count input at the end of scanning and a comparator for producing a given output when the counter reaches a predetermined count.

FIGS. 10–12 illustrate one embodiment of the photoelectric scanning means described generally above. In this embodiment, a conventional television camera 600, as also shown in FIG. 2, continually produces an analog signal which is applied to a conventional video processor 602. Video processor 602 amplifies and buffers the video signal and applies its output to a conventional detector 604 which continually compares the output of processor 602 with a reference signal provided by potentiometer 606. Potentiometer 606 is connected between amplifiers 608 and 610 which are in turn conventionally connected to video-processor 602. Amplifier 608 provides a "white" reference signal which represents the average "white" value encountered in a frame. The signal can be derived by integrating the signal over some time period. The output of amplifier 610 represents the average peak "black" level in the frame. Production of the reference signal is accomplished according to techniques well-known in the art.

The video processor preferably includes a buffer amplifier through which the input signal from the camera passes firstly to give the correct input impedance (75 ohm) and to amplify the signal to a reasonable working level. The resulting amplified video signal is passed through a black clamp unit. This comprises a summing amplifier and sence black circuit which monitors the base level of the video signal and holds it to a given level. The output of the black clamp unit is buffered to provide the video for the detector. Also it passes to a summing amplifier where it is mixed with the digital information for display and the resulting signal passed to a video monitor. The black clamp output also provides the input for a peak detection unit and a dark feature detector unit. These, together with their following generators provide the white and black reference signals for the detector unit.

The signals from the video processor 602 and detector 604 are applied to a conventional display 601 which provides a visual display of the area being scanned at any given time with an overlay of detected features. Detector or comparator 604 receives the analog input and provides a digital binary output of logic "1" if the video exceeds the reference level and a logic "0" when it is less than the reference level. Thus, the output of detector 604 is a train of "0" and "1" pulses with each "0" indicating the absence of a leaf, i.e., either a hole or the background material, and each "1" representing the leaf.

The output of detector 604 is applied to a digital shift register 612 via OR gate 614. Digital shift register 612 is shifted under the control of suitable clock pulses. The output of digital shift register 612 is coupled to data selector 616 which, in effect, constitutes a delay line and which recirculates the binary signals from each line, after a delay in time, so that, in effect, successive line scans of a parallelogram are superimposed upon each other in the digital shift register.

Data selector 616 preferably includes a digital shift register with a nominal length of 512 bits, but with outputs available at 510, 511, 513 and 514 bits. The outputs 510–514 are arranged into a group of five AND gates with the total OR output of these being fed back to the shift register input. Hence, the length of the register may be altered as required between 510 and 514 bits in length. A frame generator sets a latch for the duration of the frames, both upper and lower. This latch in turn gates line trigger pulses into a binary counter. This counter is set to count to 3 and then reset, and the 1 and 2 and 3 outputs are used to select the length of the register.

The upper frame and lower frame signals emanating from the frame generator also go to a series of AND gates and thus for the upper frame, the length of the shift register is varied below 512 bits and for the lower frame the length of the register is varied above 512 bits. Using this gating, the recirculated data in the shift register may be carried down the image at the appropriate angle for the frame.

Manual frame generator 618 generates the two parallelogram frames for the respective leaf halves, one in the top half of the field of view, and the other in the bottom half. The frames are of identical dimensions, height "B", width "C" and vertical displacement from center line "A". Each of the dimensions "A", "B" or "C", may be preset by thumb wheel switches or the like on the front panel of the unit. The angle of the parallelogram frame, however, is fixed. When the instrument tries to automatically position a frame on a tobacco leaf, it takes its "A" and "B" positions from the manual frame and tries to fit in a frame of width "C" free of all detected blemishes.

When the "last line of parallelogram frame" signal is obtained, the data from shift register 612 can be fed via AND gate 620 to counter 622. The information will pass only if a "measurement frame" signal from master control unit 642 is present indicating that a particular frame is the one on which the frame positioning process is to take place. The information is also gated with "clock" signals CL from timing signal generator TSG to allow accurate counting of the frame position to be obtained.

Thus, counter 622 counts "1"'s until reset by a "0" applied to the reset input via inverter 624. If sufficient "1"'s are counted after scanning has been completed, thus indicating a substantially hole-free region has been found, comparator 626, which is connected to the output of counter 622, provides an output signal which sets latch 628. Setting latch 628 stops the flow of "clock" pulses through AND gate 630 as a "0" input is applied thereto via inverter 634. Counter 636 now holds a count "N" which represents the distance to the bottom right hand corner of the parallelogram frame from the start of the system frame. "N" is stored in a conventional store 638.

The setting of latch 628 also sets latch 640, indicating that the leaf half is acceptable for the positioning of a good frame. If latch 640 is not set, then the leaf is permitted to pass between the two conveyor belts without being transferred to the second as described above.

The same process takes place with regard to the second parallelogram frame, the resulting position "N₂" similarly being placed in a separate store.

Referring now to FIG. 11, the number "N" is transferred to a second counter 650 which is counted further on by a pulse generator 660 applied via scaling unit 662. Pulse generator 660 is coupled directly to the drive for the first conveyor after an electro-magnetic clutch. The scaling of unit 662 is such as to give exact correlation between a given movement of the belt and the corresponding number of picture elements moved in the system.

Comparator 664 compares the value of the count in the counter 650 with a preset number, nominally 612. This number corresponds to the edge of the television field of view. Thus, the signal is obtained from counter 650 when the leaf has moved on to this position. Now the edge of the field of view can be mechanically positioned to some defined point in the conveyor system. When this point is reached, latch 666 is set to a logical "1", thus, allowing pulses from generator 660 to be applied to counters 672 and 668. At a predetermined count, comparator 670 produces a signal which causes the leaf to be transferred from the first to the second conveyor belt by the shifting of the vacuum applied thereto. At a second count in counter 672, comparator 674 produces a signal which stops movement of the second belt after transfer of the leaf thereto so that the leaf will have traversed the distance to the center line of the second conveyor belt. A trigger signal is also produced as shown to start the mechanical timing cam which controls further mechanical movement of the leaf.

Referring now to FIG. 12, the output of comparator 674 resets latch 675 on input "R" thereof thus blocking pulses from pulse generator 676, which is preferably driven directly by the motor which drives the first conveyor, from being passed via AND gate 678 to the second motor drive 684. However, pulses are still received via AND gate 694 since latch 690 is set. The setting of latch 690 by the output of comparator 674 also applies pulses to counter 692 via AND gate 694. When the number in counter 692 reaches some predetermined number set in comparator 696, latch 690 is reset to stop stepping motor 684 by disabling gate 694. The number "D" at which latch 690 is reset is preferably one-half revolution of the belt so as to move the leaf 180°. When the leaf has been removed from the second belt, and is returning to the horizontal position after carrying out one vertical movement cycle, a set signal is obtained from the mechanical timing cam and applied to set input "S" of latch 675 to set latch 675 and commence the drive to the second motor.

Figure 10A:
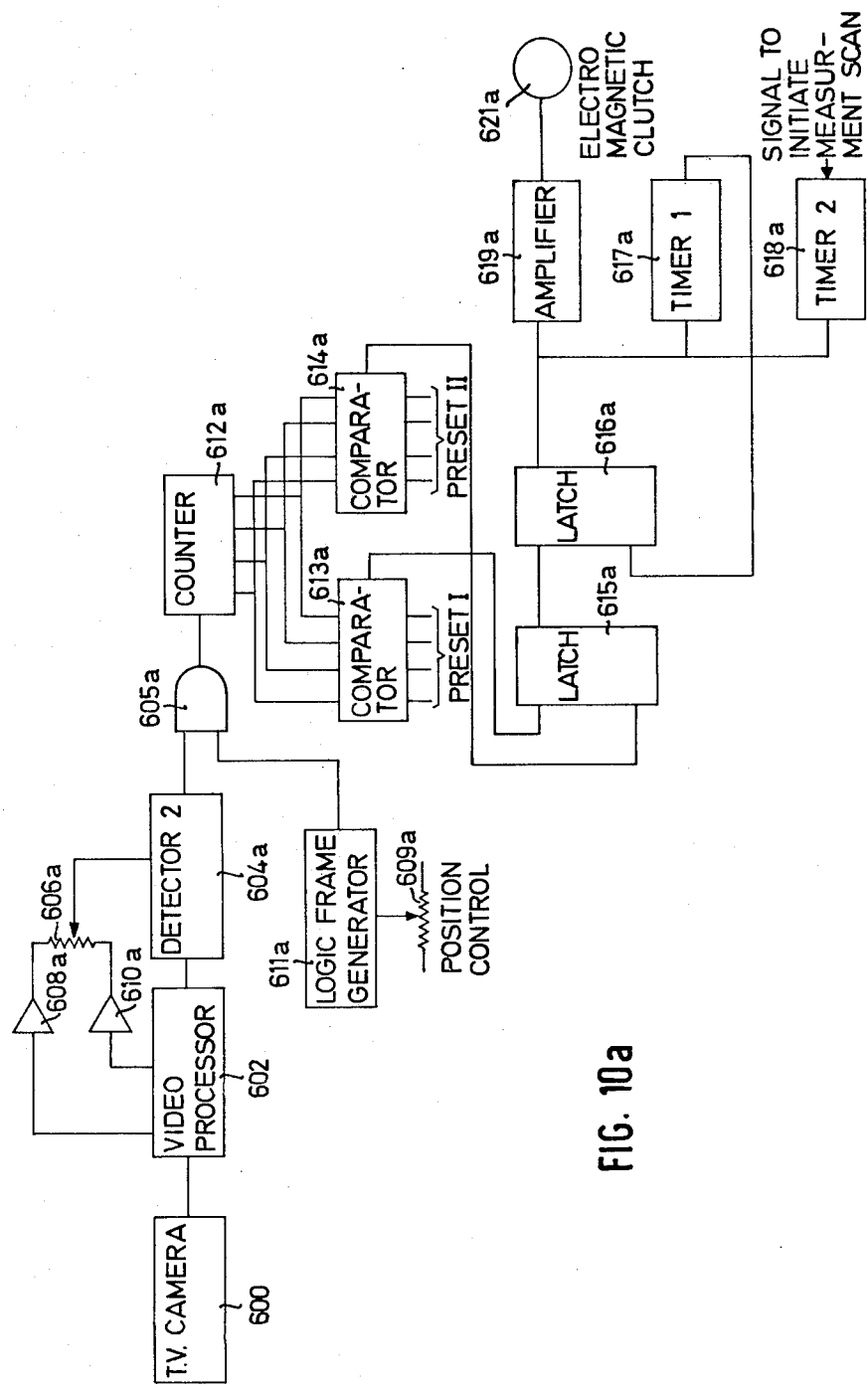

Referring now to FIG. 10a which shows the system for the stopping of the first conveyor belt, the television camera output 600 is coupled to the video processor 602 as described. The detector 604a, comparator potentiometer 606a and attached amplifiers 608a and 610a are identical to their counterparts in FIG. 10. The output of the detector is passed to the AND gate 605a where it is gated with the logic gate frame 611a, the position of this frame being adjustable in the field of view using the position control 609a. The gate frame generator 611a generates a very narrow "window" so that in effect a narrow vertical section is examined and a signal generated indicating the leaf height in a direction transverse to the direction of movement and the direction of the removed stem. The output of the AND gate 605a passes to the decade counter 612a, the resulting binary number being compared with two preset numbers in comparator one 613a and comparator two 614a. When the counter number exceeds the preset number I the latch 615a is set and when the counter number falls below preset number II the latch 615a is reset, preset number I being greater than preset number II. This occurs as the leaf is moved after scanning and prepares latch 615a for the next leaf. The latch 615a is of course reset again, without effect, by the leading edge of the leaf. The setting or resetting of latch 615a is only allowed to occur during the period of the Frame Trigger signal 620a which exists as a logic "1" during the period of frame fly-back on the television scan. When latch 615a is set to a logic "1" state this in turn sets latch 616a to a logic "1". This logic "1" output is buffered and amplified through amplifier 619a to a level and power sufficient to operate the electromagnetic clutch 621a. Also when latch 616a is set to a logic "1" monostable time I 617a and monostable timer II 618a are both activated, the period of the timing pulse generated by monostable 617a being longer than that of timer 618a. The output of latch 616a is reset to a logic "0" at the end of the output pulse generated by monostable 617a and this in turn releases the electromagnetic clutch 621a via the amplifier 619a. At the end of the period time by monostable 618a the measurement scan of the framing system is initiated.

We shall now turn our attention to the situation when out of every leaf half more than one frame has to be scanned, by way of example for the particular case that the scanning is performed according to a plurality of frames of different size and shape, and for the preferred embodiment whereby all frames are parallelograms.

From FIG. 1 it is clear that generally the most efficient and thus preferred procedure will be to carry out the scanning in a direction substantially parallel to the straight side of the deveined leaf half. Other directions of scanning are, however, in principle not excluded. One system of scanning, which we shall call Scan System I will now be described.

Figure 13:
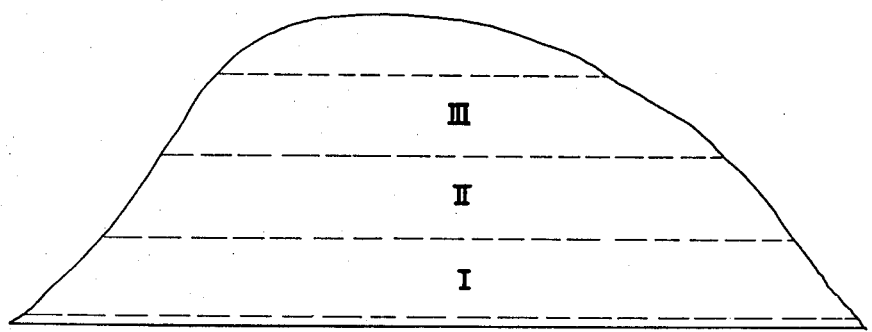
FIGS. 13 and 13a show a leaf divided into sections.

The following is an outline of a system to allow up to 3 different sized parallelogram frames to be positioned onto one half of a tobacco leaf. It being possible to position any of the three different sizes of frame in any of three separate sections on the leaf half. FIG. 13 depicts the leaf half and shows the three different sections into which the frame can be positioned. The actual height of each section being dependent upon the frame positioned in that section.

Much of the operation of this system will be as described before.

Firstly the operation of the system will be described within Section I of the leaf shown in FIG. 13.

Three sizes of blank are to be considered A, B, C, with A>B>C and each being parallelogram frames of the same shape, the height and width of each frame being set into the machine via controls on the front of the instrument. Also the base positions of the frame, X in FIG. 13a will be set via a control on the front of the instrument, this being the same method as used for setting the frame as described before.

The leaf will be automatically stopped in the field of view by using a small frame, as described above. Once the leaf has stopped it will be analysed completely in three scans of the television system, the first analysing section I, the second section II and the third section III. Although we will only consider one half of the leaf each analysis scan will operate on the respective sections (I, II or III) on both halves of the leaf. Hence the system as described will effectively be duplicated to cover the other half of the leaf.

The method of scanning any one particular section for any one particular frame will be the same as that described in FIG. 10 of the preceeding text. Therefore, if we know the base line position we can scan Section I of the leaf and position a frame of any given size say A.

By a similar procedure the leaf could be rescanned with the frame size changed to say size B and the Section I analysed to see if an acceptable area can be found. Similarly with the frame size set to C the section could be rescanned and an acceptable area found for the size of frame if possible, the various sizes of frame A, B and C being fed sequentially to the Manual Frame Generator shown in FIG. 10.

It is also possible to have three analysis systems similar to the analysis system shown in FIG. 10 each system operating on one from sizes A or B or C. Thus in one scan of the system the analysis could be completed in section I for all of the three frame sizes A or B or C. It is also obvious that a priority accept circuit can be placed on the Accept Frame signals from each of the three analysis circuits such that if any preference in the frame size is required by the operator (i.e. a greater quantity of cigars are required from frame size B say than A or C) then this size will be accepted first and only if the required size frame fails to be fitted in will either of the other two be accepted. Since the above tripling of the acceptance system follows directly from FIG. 10 and also since the concept of priority encoding is an accepted concept in the state of the art of digital electronics this facet of the system will not be examined further.

Therefore if we use three parallel analysis systems it is possible to analyse for the three frame sizes A, B and C in one scan of the system. Hence if it were not possible say to position a frame A in Section I of the leaf it may be possible to position either a B or C frame without need to rescan the leaf.

Having scanned Section I and found either an A, B or C frame, Section II of the leaf can be analysed. The base line used for Section II however will depend upon what has been found during the scan of Section I and will not simply depend upon which frame is positioned in that section.

Figure 13A:
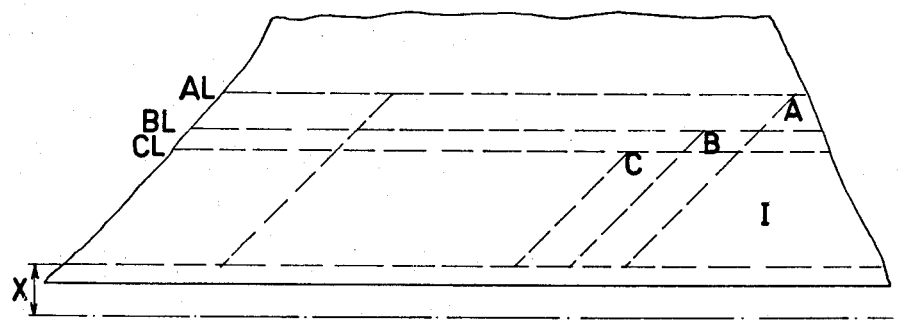

If we consider FIG. 13a and ignore the fact of which frame may have been placed in Section I, as the television scan progresses down the leaf if any holes are found between the level AL and BL then BL would probably be unsuitable as a base line for Section II. However, if no holes were formed BL would be a better base line for Section II since it would give better utilisation of tobacco. Similarly CL would be even better provided no holes existed between it and either AL or BL.

By correlating the information between the parallel analysing circuits it will be possible to see if any holes have been recorded in the "A" circuit before the "BL" level is reached and similarly for the "CL" level. Thus the 3 analyser outputs may be utilised to define the best base line for Section III.

However, the base line for Section II must also take into account if a frame has been positioned in Section I. Thus the final base line to be used for Section II will be whichever is the larger in height of that defined for the frame in Section I or from the correlation of holes in the areas AL→BL→CL.

Figure 13B:
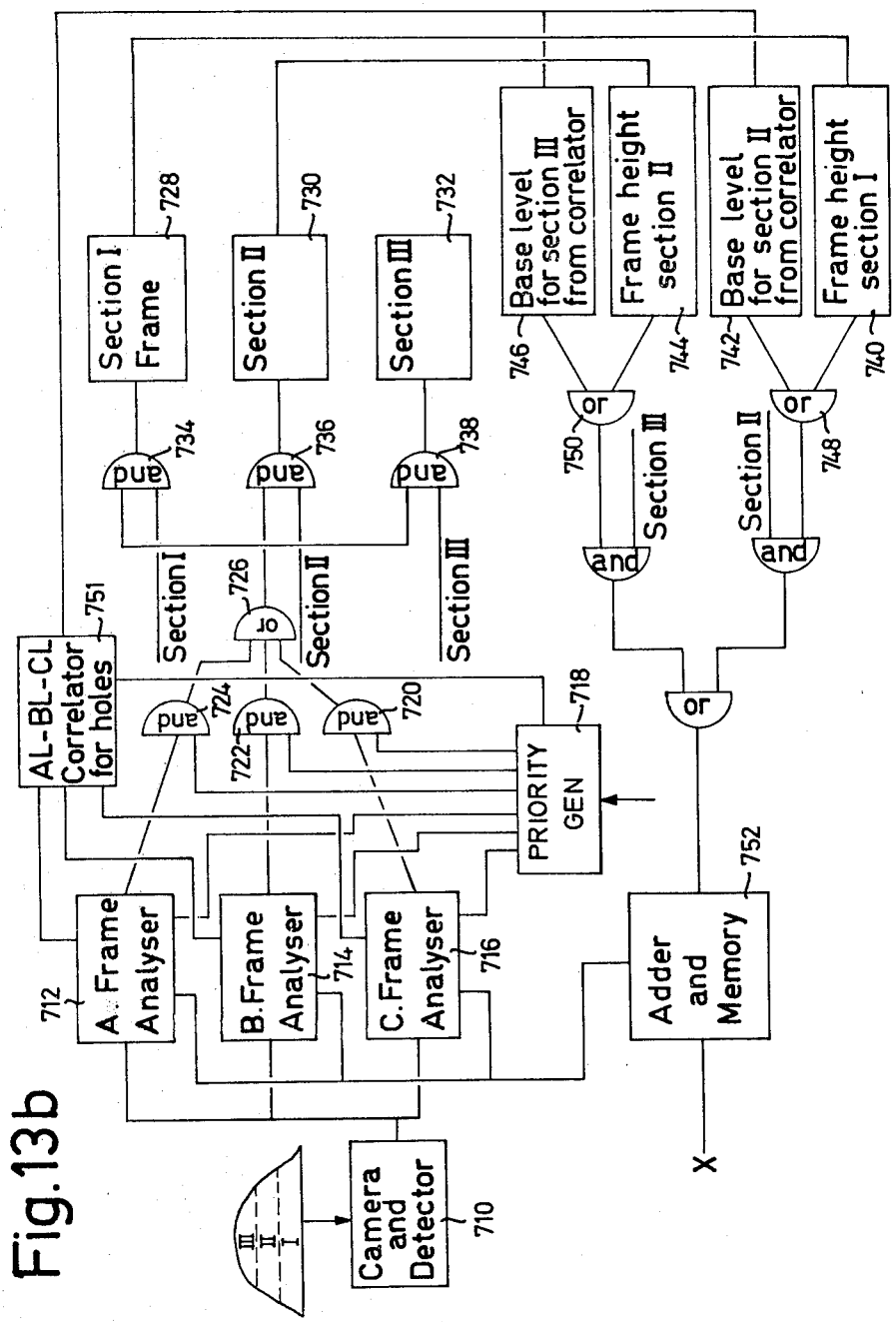
FIG. 13b shows a circuit for controlling the second embodiment.

A schematic diagram for the implementation of this system is given in FIG. 13b.

Having obtained the base line for Section II of the leaf it is possible to use the identical circuitry as described above for Section I to analyse Section II. It is possible to utilise the same circuitry provided an electronic store is added to store both the co-ordinates giving the position of the frame of Section I and also a code for which type of frame it is A or B or C or no frame at all if none of the three types can be correctly positioned. Since the addition of this electronic store is also an accepted state of the art no further description of this will be given. Note also that in FIG. 10 the Accept Leaf Half signal will in this case become Accept Leaf Section I, II or III depending upon which section is being analysed and providing an A, B or C frame can be correctly accepted, and this accept signal will also be stored together with the type of frame and it's co-ordinates. Therefore, the same circuitry as used for Section I can be used to attempt to position either an A or B or C frame in Section II and also priority accept the required frame if possible and store both the type of frame selected and it's co-ordinates. Similarly for Section III. Camera and detector 710 produce a sequence of binary signals for each line, each signal indicating the presence or absence of a hole. The sequences are each analyzed by analyzers 712, 714 and 716 which respectively determine and store the number and locations of frames of size A, size B and size C for each of Sections I, II and III.

The analyzer and frame which is selected is controlled by a priority generator 718 which controls gates 720, 722 and 724 to pass the output of one analyzer through OR gate 726 and thus select the desired frame. Generator 718 may simply choose in a fixed order e.g. A always over B, B always over C. Alternatively manual or automatic input may cause the order of priority to vary according to demand or some other criteria.

A frame A, B or C is then generated in turn for each of the sections 728, 730 and 732 and applied via AND gates 734, 736 and 738. Correlator 751 determines for each analyzed frame whether holes exist between the top of the chosen frame and the lines AL, BL or CL as shown in FIG. 13c and accordingly whether the frame top or line AL, BL or CL should be used as the base for the next section.

The base level for Section II is set by either the frame height section 740 of base level 742 from correlator 751. Similarly, frame height 744 and base level 746 determine the level for Section III. The outputs of gates 748 and 750 is applied to adder 752 which thus indicates the vertical position of each frame in turn.

As can be seen from FIG. 13b it would be possible to increase either the number of frames (A, B, C, D, E etc.) or the number of leaf sections (I, II, III, IV etc.) without much basic system modification.

Once a frame A, B or C has been positioned in each of the sections I, II and III the appropriate data may be output to control the mechanical system. This will effectively be the base line heights to control the position of cutters governing the width of each section. Also the co-ordinates of a given point of the frame to control the positioning of the leaf section to the correct point on its die.

The system as outlined in FIG. 13b will with the addition of some memory units operable on both halves of the leaf in the scans. This system will be as is already described for a single frame and scan.

Figure 13D:
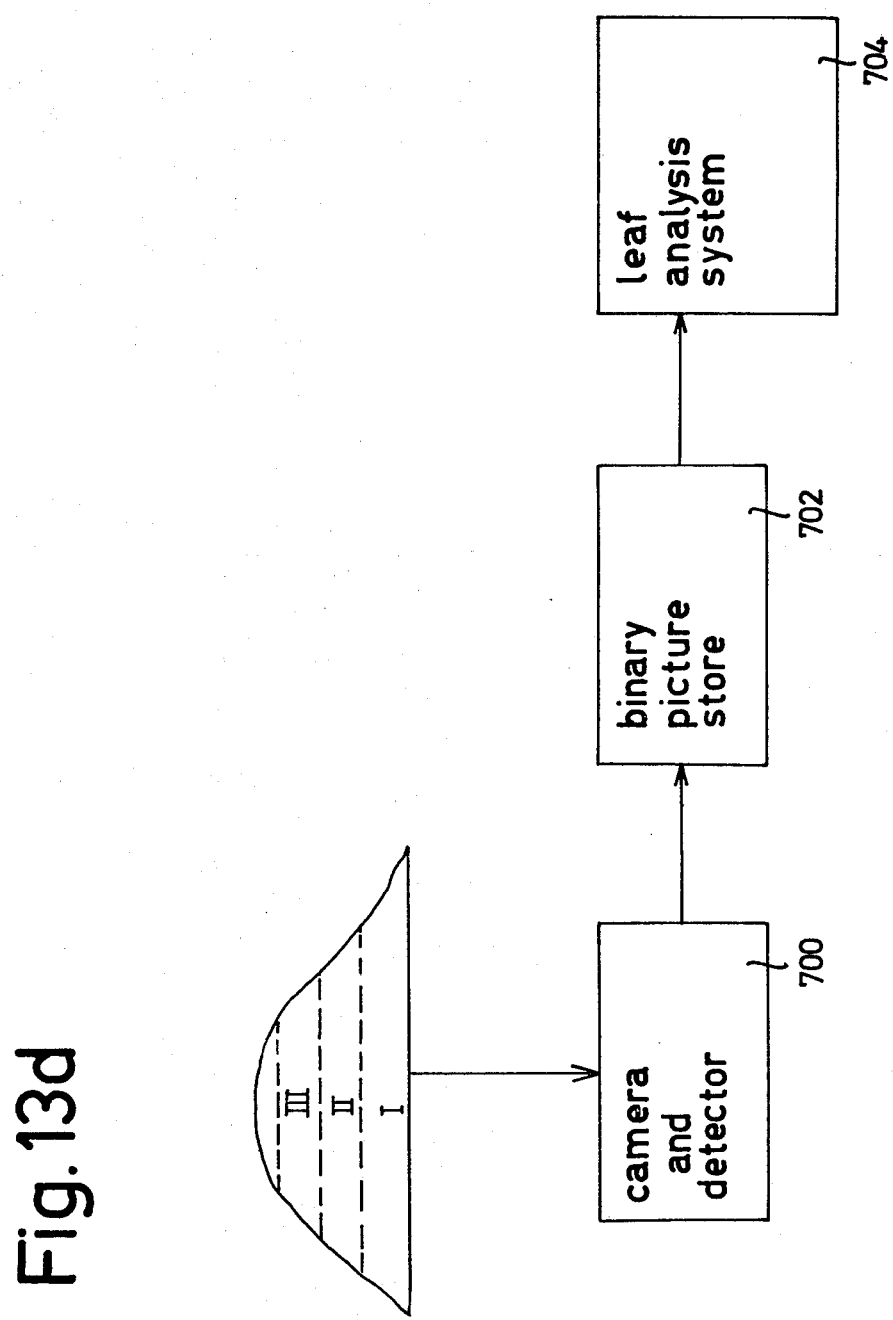
Figure 13E:
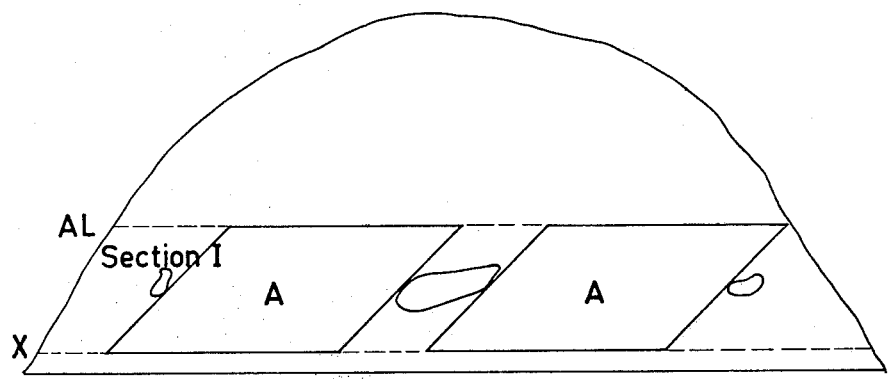

FIG. 13e shows a tobacco leaf on which all frames A, B and C will be rejected in Section I due to a large fault on the leaf base. Since this can occur fairly often the system will operate on two base lines X and X+ΔX. This will allow much better utilisation of tobacco since the X addition to base line values will operate on each section of the leaf as described below.

ΔX will be a fixed number set from the controls on the front of the Central Processor unit and programmed in line widths of the raster scan.

To avoid any increase in the analysis time and since the actual Frame Analyser circuitry is relatively simple this system may be implemented by using six Frame Analysers. This will measure for frames A, B and C on base line X and for A, B and C (A', B', C') on base line X+ΔX. Thus in Section I of the leaf there will be six possible variations on the frame position and size. The priority for the acceptance of which frame is used will be A then B then C then A' then B' then C', assuming acceptable conditions are obtained for more than one frame, which is quite possible.

The base line position for Section II of the leaf will be generated using information from all six Frame Analysers plus whichever frame is positioned in Section I. This will be exactly the same way as shown in FIG. 13b except the whole correlation unit will operate for AL→BL→CL and for AL'→BL'→CL' (see FIG. 13c).

Having defined the base line for Section II the analysis will take place using this base line in three of the Frame Analysers and then for this base line value plus the ΔX increment in the other three. Similarly the base line for Section III may be defined from Section II and analysis carried out as for Sections I and II.

This system gives a great many possible variances on the actual frame positions for Sections I, II and III and will lead to a high utilisation of the leaf.

An alternative scanning system will now be described, which we shall call Scan System II.

The basis of this system is to scan the leaf once and to put all of the detected information from the leaf into a binary picture store, as well known in the art. This would allow the information relating to holes etc. on the leaf to be obtained after one scan and then this store could be scanned several times as required to position the blank frames in the various sections of the leaf.

FIG. 13d shows a simplified schematic system giving the situation of the binary picture store in relation to the system. The analysis system may be the fast parallel system as outlined in the description of System I or it may embody only one Frame Analyser in which case it could require possibly 18 scans to obtain the data. However once the detected information has been read into the store the leaf could be released to continue its journey along the conveyor belt whilst its stored image is being analysed.

The camera and detector 700 operate as described above to produce a sequence of binary signals each indicating presence or absence of a hole in a discrete area. Each of these signals is then stored in a binary store 702 which may be any suitable electronic memory.

The store signals can then be analysed in a system 704 which determines the available portions to be cut, if any, and produces signals for controlling cutting.

Once the analysis of the stored image has been completed the data would be fed on to the cutting means.

This method would not improve the total throughput rate of the system since the actual analysis time would be larger then for the previous System I. However, it would reduce very slightly the period for which the leaf is stationary under the camera.

A third scanning system will now be described which we shall call System III. This system would utilise either of the analysis modes given in I and II previously but would allow 2 frames to be positioned in any one section of the leaf.

FIG. 13e shows the general outline of the system positioning two A size frames in Section I of the leaf.

Figure 10B:
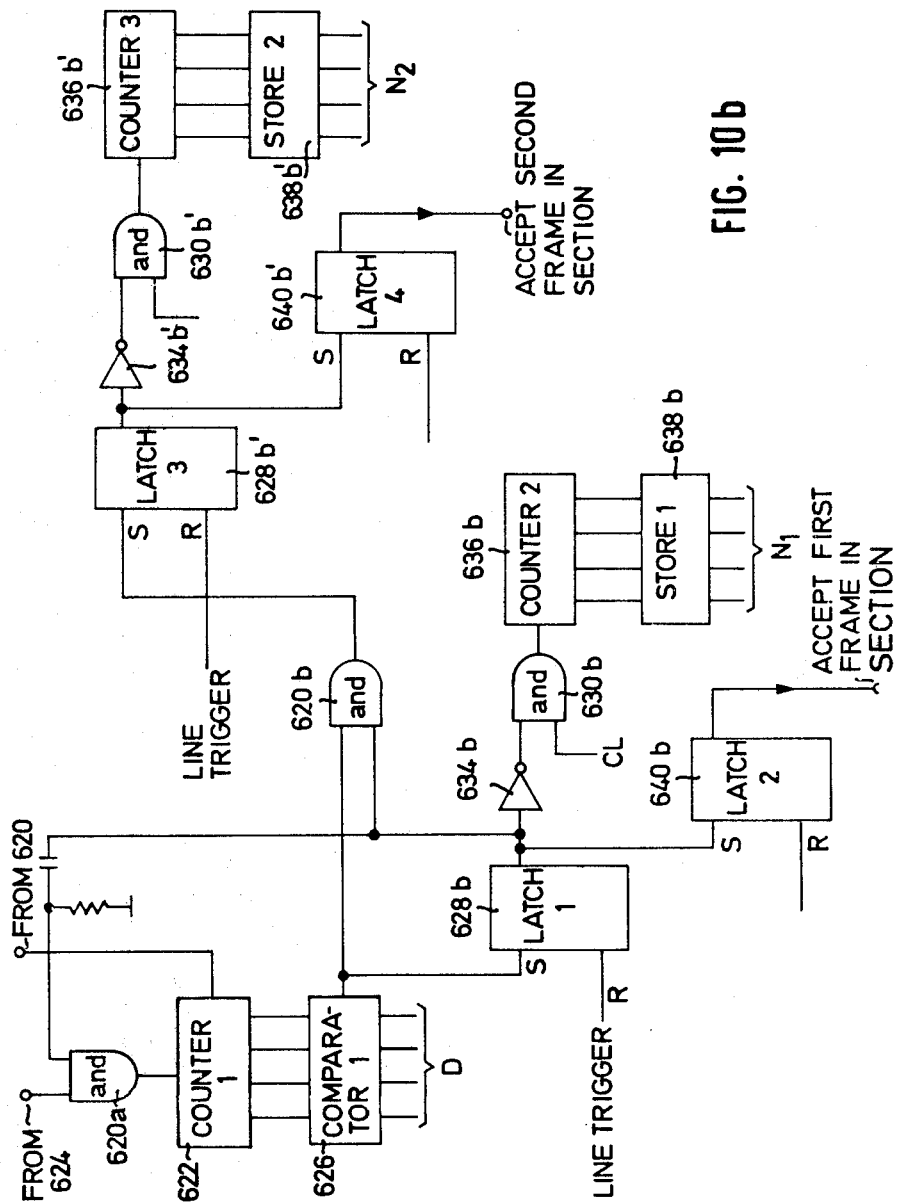

FIG. 10b shows the modification required to the system to include the facility to measure two frames in any one section. Each of the types of circuit functions marked with a suffix b and also with a suffix b' on FIG. 10b are identical to those circuit functions on FIG. 10 having the same number but no suffix.

Figure 13F:
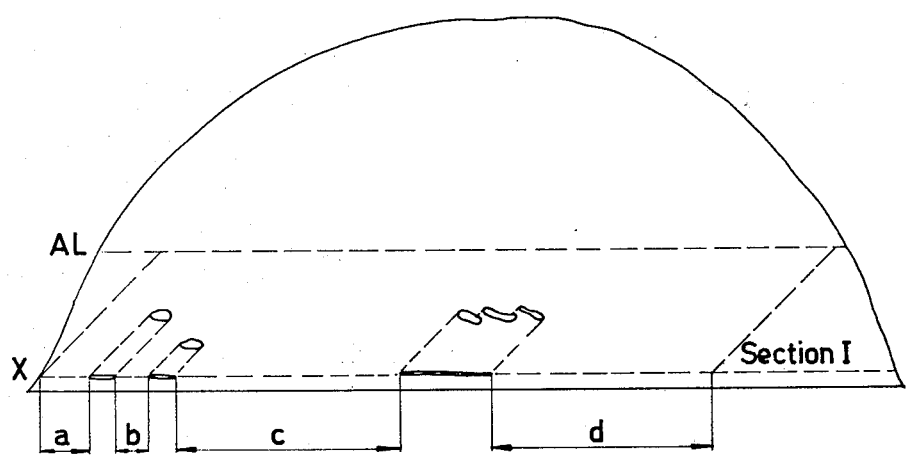
FIG. 13f show a leaf section for an embodiment with a binary store.

The system operates such that, as mentioned in the description of the system of FIG. 10 described earlier, all the detected holes etc. in the leaf section being analysed are carried down to the last line of the frame (or section) as shown in FIG. 13f where the final analysis is made. Then by analysing along this line the clear lengths (a, b, c, d in FIG. 13f) can be measured and compared with the required length (D in FIG. 10b) and if any of the lengths a, b, c, d etc. are equal to or greater than D then the appropriate frame can be replaced in that position. Therefore, if two of the clear lengths a, b, c, d, are equal to or greater than D or if one of them is equal to or greater than twice D two frames with a length corresponding to D may be positioned in the section. To solve this problem a part of the circuit of FIG. 10 is modified, e.g. as shown in FIG. 10b with the addition of two AND gates 620a and 612b. The operation is such that once the first part of the circuit (those shown as suffix b) in FIG. 10b has measured a length equal to D along the best line of frame the Latch I 628b will be set to a logic "1". The instant this occurs couter 1 622 will be reset momentarily and then start counting again. Then if a second equality is found between the appropriate length along the last line of frame and the present number D the AND gate 620b will pass the signal to set Latch 3 628b, hence recording the position of the second frame in counter 3. Components 634b, 634b', 630b, 630b', 636b, 636b', 638b, 638' and 640b, 640b' have the same function as components 634, 630, 636, 638 and 640 described in relation with FIG. 10.

Similarly the number of frames positioned in any one section may be increased by simply adding further circuitry of the format shown in FIG. 10b.

The restrictions on this system are that any frames cut in any one section of leaf must be of the same size.

It would be possible to measure more than two frames in any one section of leaf (assuming the sections were big enough) by using more registers to monitor the clear lengths of leaf.

This analysis to check for extra frames would be carried out in all sections of the leaf without increasing the number of scans required. Thus for system I it would still be possible to analyse the complete leaf with all framing combinations in 3 television scans.

Figure 13G:
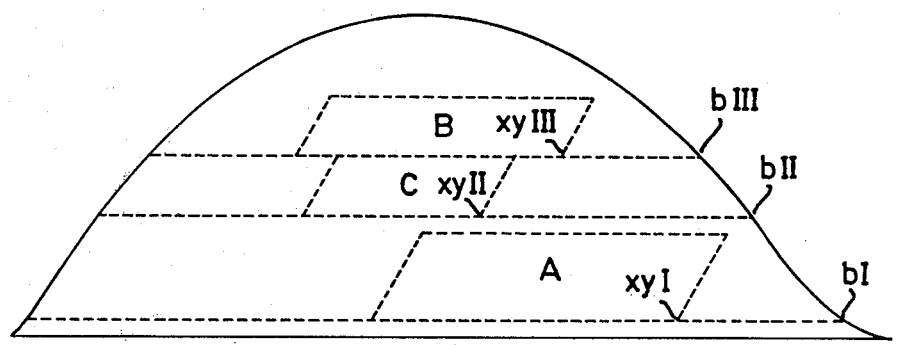
Figure 13H:
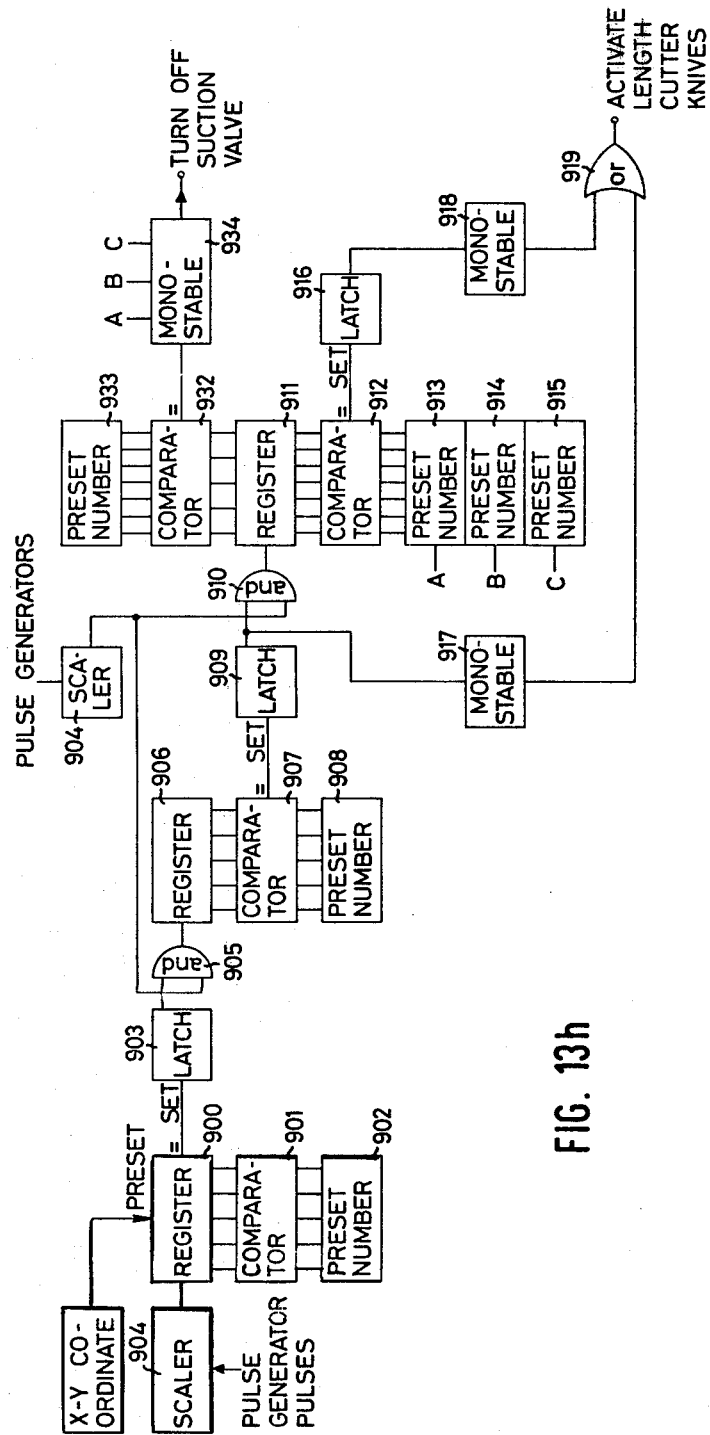
FIG. 13h and 13i show circuits for controlling knife positioning and operation in the second embodiment.
Figure 13I:
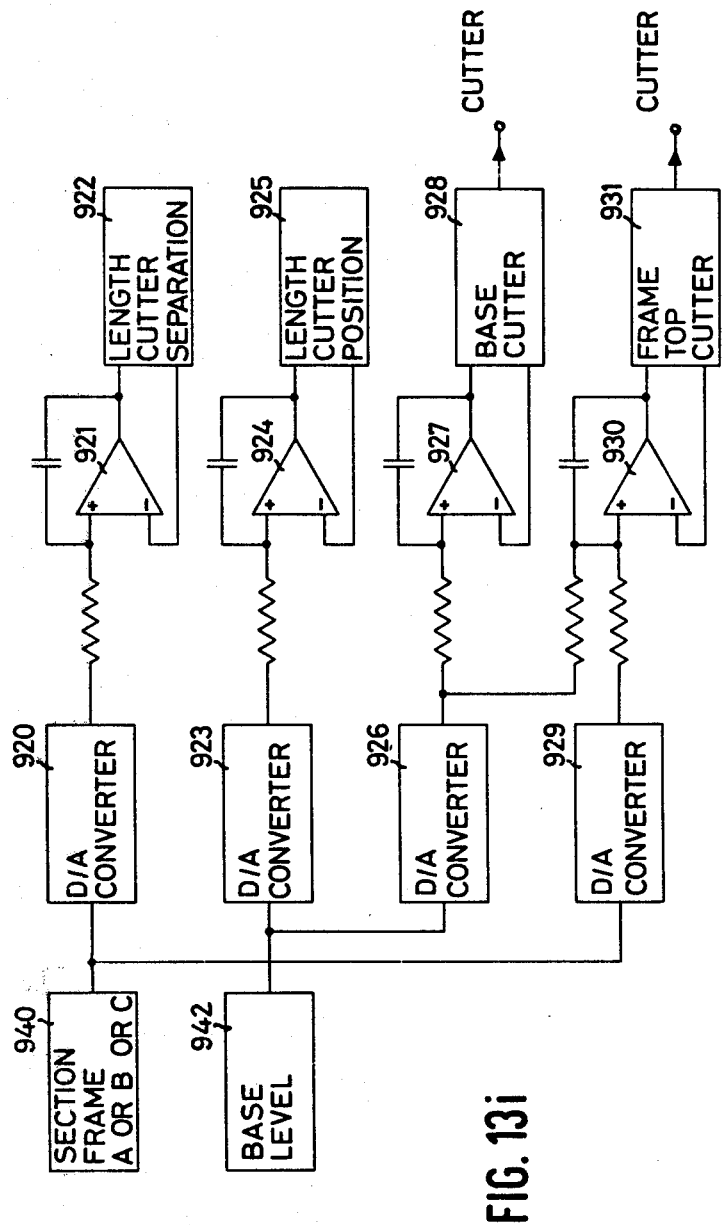

In FIG. 13i and 13h a schematical example is given for the electronic control system for a mechanical system which will be described below with the help of the FIGS. 14-14c and for just one section of tobacco leaf.

Figure 14:
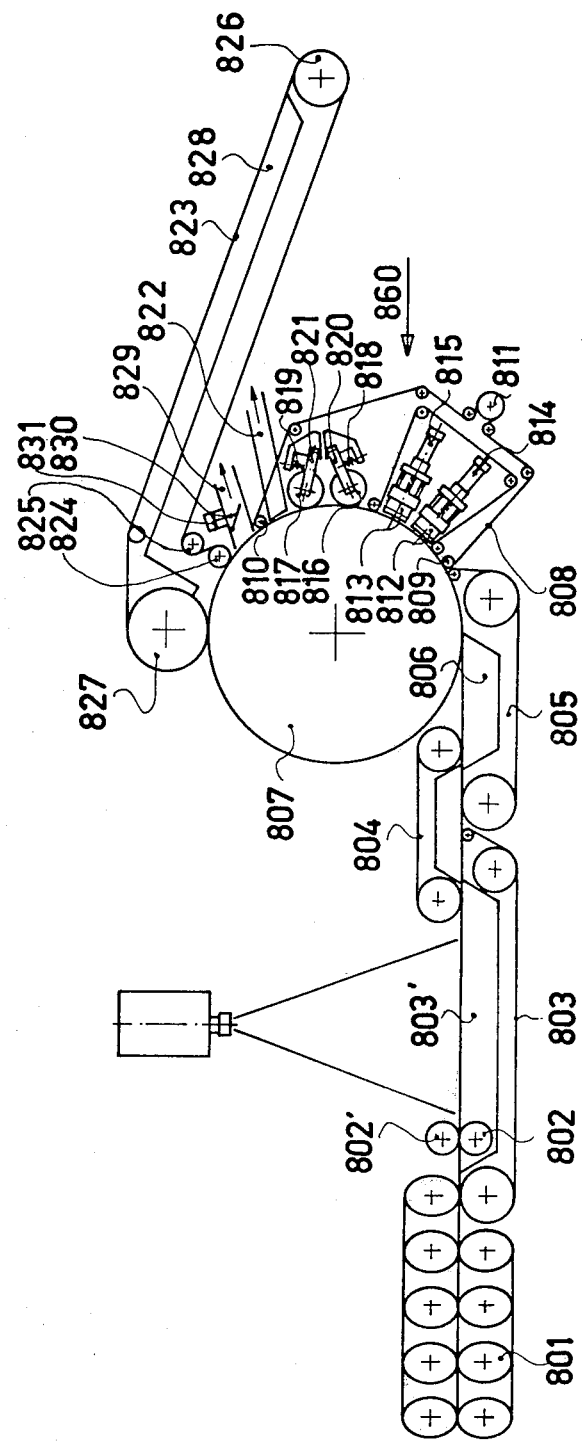

FIG. 14 is a cross section through the heart of the machine in question which is one example of the many mechanical systems, which can be devised according to principles known in the art when the principles according to the invention are applied.

The whole tobacco leaf is fed in by hand and stretched by the apparatus shown schematically at 801. A more detailed description of the stretching device has already been given in discussing FIG. 2a, while the main vein of the leaf is out by the rotating knives 802 and 802'. For each leaf half there is an endless belt 803, made of porous material, with a vacuum chamber 803' below the upper portion of the belt, as already mentioned in discussing FIG. 2a.

Scanning is performed as described above as soon as the leaf is in the correct position and the belt 803 has been stopped, the system for this being already described above. Scanning being completed the belt 803 starts moving again and the leaf half is taken over by the "transfer belt" 804, constructed of the same material as the belt 803 while the endless belt 805 again takes the leaf half over from 804 (see also for a transfer belt FIG. 4b). The endless belt 805 is provided with a suction chamber 806 for part of its length. At the point where said suction chamber ends the leaf half is pressed between the belt 805 and a drum 807 having the same circumferential velocity as the belt.

After having been released by the belt 805, the leaf half is held pressed against the drum 807 by an array of narrow endless plastic belts of which the frontal one is to be seen at 808. This belt is held taut by ten small "lead rolls" of which two are indicated with 809 and 810, (the rest being easily identified in the drawing). The belt is actuated by the small drum 811. The short sides of a parallelogram to be cut out of a tobacco leaf are cut by the knives 812 and 813, which are actuated respectively by the pneumatic cylinders 814 and 815. The base line of that parallelogram is cut by the rotatable knife 816 while the top line is cut by the knife 817. These knives are held pressed against the drum 807 by spring 818 and 819 attached to the levers 820 and 821. For the other parallelograms, to be cut out of the leaf half there are additional sets of knives, equivalent to the ones just described. These are not shown in the drawing, being located behind those mentioned. Together the knives cut the tobacco leaf half in strips (parallel to the main vein), each strip containing one, or as the case may be two, cut out parallelograms.

The arrangement of the narrow belts, which hold the leaf half pressed against the drum 807, as mentioned above and the cutting knives will be further clarified in discussing FIG. 14a and FIG. 14b below.

Those parts of the tobacco leaf half which remain after all parallelogram are cut and are not restrained by the narrow belts are sucked away by suction ducts between the narrow belts of which the foremost is to be seen at 822.

The strips of tobacco leaf which remain after the leaf half has passed the suction ducts just mentioned are further transported, pressed between the drum 807 and the endless conveyor belt 823. This belt is held taut by the lead rolls 824 and 825, the actuating drum 826 and the perforated drum 827. Said belt is made of porous material so that strips of tobacco leaf are sucked unto it by vacuum applied in the vacuum chamber 828.

Between the lead rolls 810 and 824 suction ducts are located, the frontal one is to be seen at 829. By these ducts the parts of the strips between the parallelograms are sucked away. At the moment a parallelogram arrives in front of one of these suction ducts a valve 830 is closed by a small pneumatic cylinder 831, which is controlled by the electronic system.

Figure 14A:
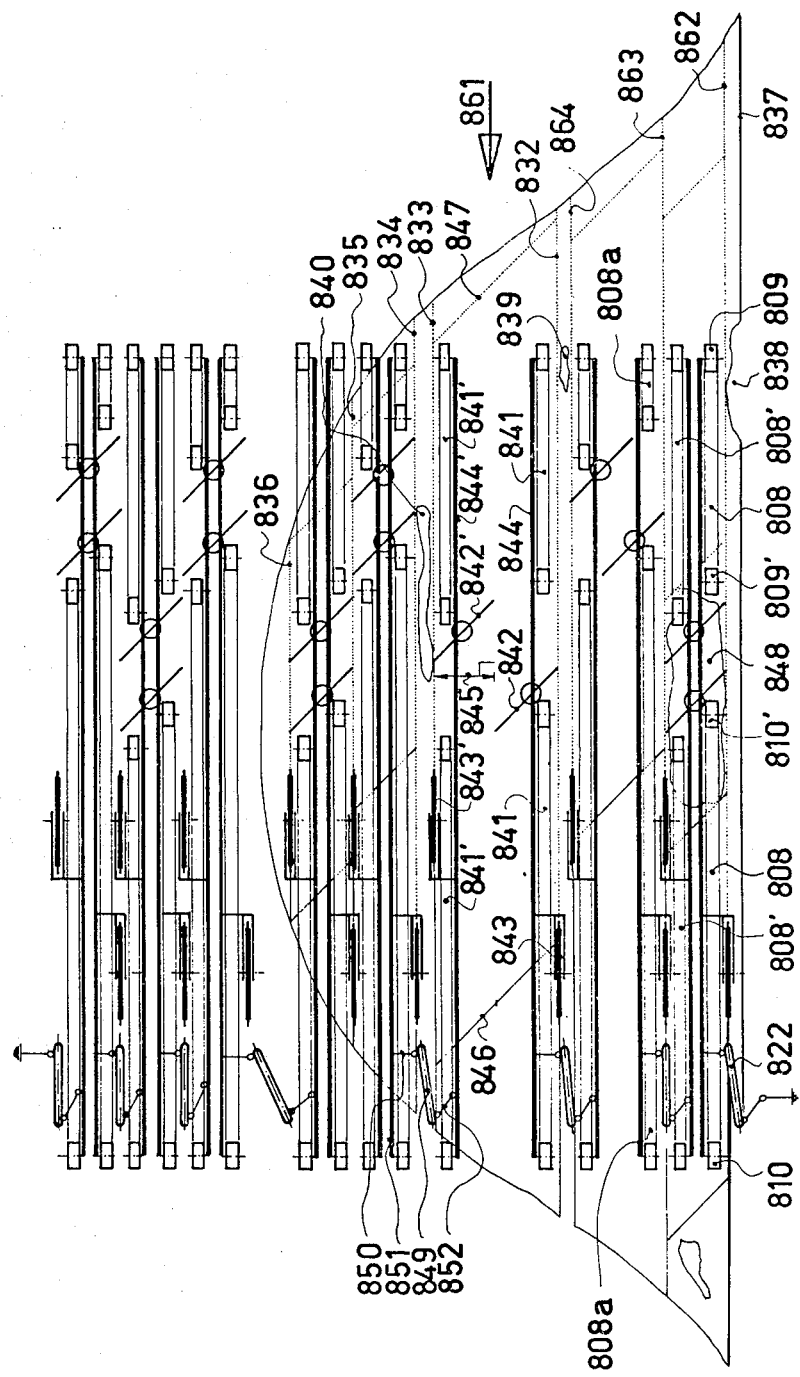

FIG. 14a is a side view in the direction of the arrow 860 in FIG. 14, schematically clarifying the arrangement of the narrow belts 808 etc., and the knives 812, 813, 816, 817 etc. and further appurtenances. The leaf half is moving in the direction of the arrow 861. It is assumed that the scanning has revealed in this case that the leaf half can be divided into five useful sections. The base line of the first section is indicated at 862 the top line at 863. This top line of the first section is in this particular case at the same time the base line of the second section, of which the top line is indicated at 864. The third section has its base line at 832 and its top line at 833, the fourth section's base line is at 834, the top line being located at 835, which is also the base line of the fifth section, having its top line at 836. In this example the following parts of the leaf half are rejected: the strip between 862 and the edge 837 of the leaf half, the strip between 864 and 832, the strip between 833 and 834, and the strip between 836 and the "top" of the leaf half. Holes necessitating the rejection are indicated at 838, 839 and 840.

The narrow belt already shown in FIG. 14 at 808 is also indicated with this number in FIG. 14a, as well as the lead rolls 809 and 810. By the lead rolls 809 and 809' part of the belt is pressed against the drum 807 in FIG. 14. Another part of the belt 808 is pressed against the drum 807 by the lead rolls 810 and 810'. Between the lead rolls 809' and 810' the belt makes a "loop", and is lead around the actuating drum 811 as is clearly to be seen in FIG. 14. To the first section of the leaf half belongs also the narrow belt 808', to which we shall come back in the underfollowing. Between 809' and 810' the first section of the leaf half is not pressed against the drum 807, but the belts belonging to the second section take over this function, so that the leaf half is always held taut against the drum 807. One belt belonging to the second section is indicated with 808a.

We now come to the discussion of the cooperation between the knives and belts used for each section of the leaf half. For reasons of clarity we choose the third section—that between the base line 832 and the top line 833—which as drawn in FIG. 14a is rather wide. This section is served by the two narrow belts 841 and 841'. The knives used for cutting the short sides of a parallelogram are shown at 842 and 842', while the rotatable knives used for cutting the base line and the top line are shown at 843 and 843'. The knives 842 and 843 are attached to the frame plate 844, to which also the belt 841 is attached through its lead rolls. The knives 842' and 843' are attached to frame plate 844' to which also the belt 841' is attached through its lead rolls. The distance between the frame plates 844 and 844' is variable. The maximum width of a section of the leaf half is equal to two times the length indicated by 845, the minimum width being equal to that length.

Now when the tobacco leaf half is moving in the direction of the arrow 861 in the case that the third section has its maximum width the following happens. At the right moment, dictated by the controlsystem, the knife 842 will cut into the leaf. The leaf then moves on and exactly at the moment that the cut made by the knife 842' is end to end with the knife 842 this knife will be actuated. When the third section has the minimum width the knife 842 will cut at exactly the same place where the knife 842' has already cut. In between these two extremes the cuts will partly overlap.

From the above it will now be clear how the parallelogram formed by the base line 832, the top line 833 and the short sides 846 and 847 is cut out by the combined action of the knives 842, 842', 843 and 843'. Due to the hole indicated by 840 the strip of tobacco leaf between 833 and 834 has to be rejected. In discussing FIG. 14 we have already mentioned that these strips are sucked away by suction ducts of which the frontal one was shown at 822. At 849 we see the orifices of the suction duct which is used to suck away the strip between 833 and 834. One end of the suction duct is hinged to the small rod 850 which is attached to the frame plate 851. The other end of the suction duct is hinged to the lever 852, which in its turn is hinged to the frame plate 844'. In this way the orifice of the suction duct can accommodate itself to a varying width of the strip which has to be rejected.

When in one section there is a piece of leaf which cannot be used it may be possible to cut out two short frames. In FIG. 14a this case is illustrated in the first section between the base line 862 and the top line 863. A large hole is shown at 848. Nevertheless two narrow parallelograms can be cut out, as indicated by the dotted lines. The piece of tobacco leaf between the two parallelograms, and the piece in front and behind are sucked away as described in discussing FIG. 14 by the suction ducts of which the frontal one was shown at 829. FIG. 14b is a perspective view of the combination of narrow belts, lead rolls, knives and frame plates, discussed at the hand of FIG. 14a (only for three sections).

At 808 and 808' we see the narrow belts belonging to the first section. At 809, 809', 810 and 810' are shown leaf rolls for the frontal narrow belt at 811 the small drum to actuate that belt. At 812 and 813 we see the knives to cut the short sides of the parallelograms in the first section. These are actuated by the pneumatic cylinders 814 and 815. The rotatable knives for cutting the top and the base line of the first section are shown at 816 and 817. As already said the knife 817 is held pressed against the drum 807 by the spring 819 attached to the lever 821. The spring 819 is at its other side attached to the block 853 making part of the frame plate 854.

All frame plates are axially movable over the shafts 855, 856 and 857; they are connected to those axles by gliding bearings. The movement of the frame plates is governed by steering shafts attached to them. For the frontal frame plate 854 the steering shaft is shown at 858. Above and below the steering 858 are shown the steering shaft for the other frame plates.

The small actuating drum 811 for the frontal belt 808 is attached by a bearing to the frame plate 854 and is axially movable along the "toothed" axle 859. The shafts 855, 856 and 857 are firmly attached to the main frame of the apparatus, while the axle 859 is attached to this frame by a bearing.

Figure 14C:
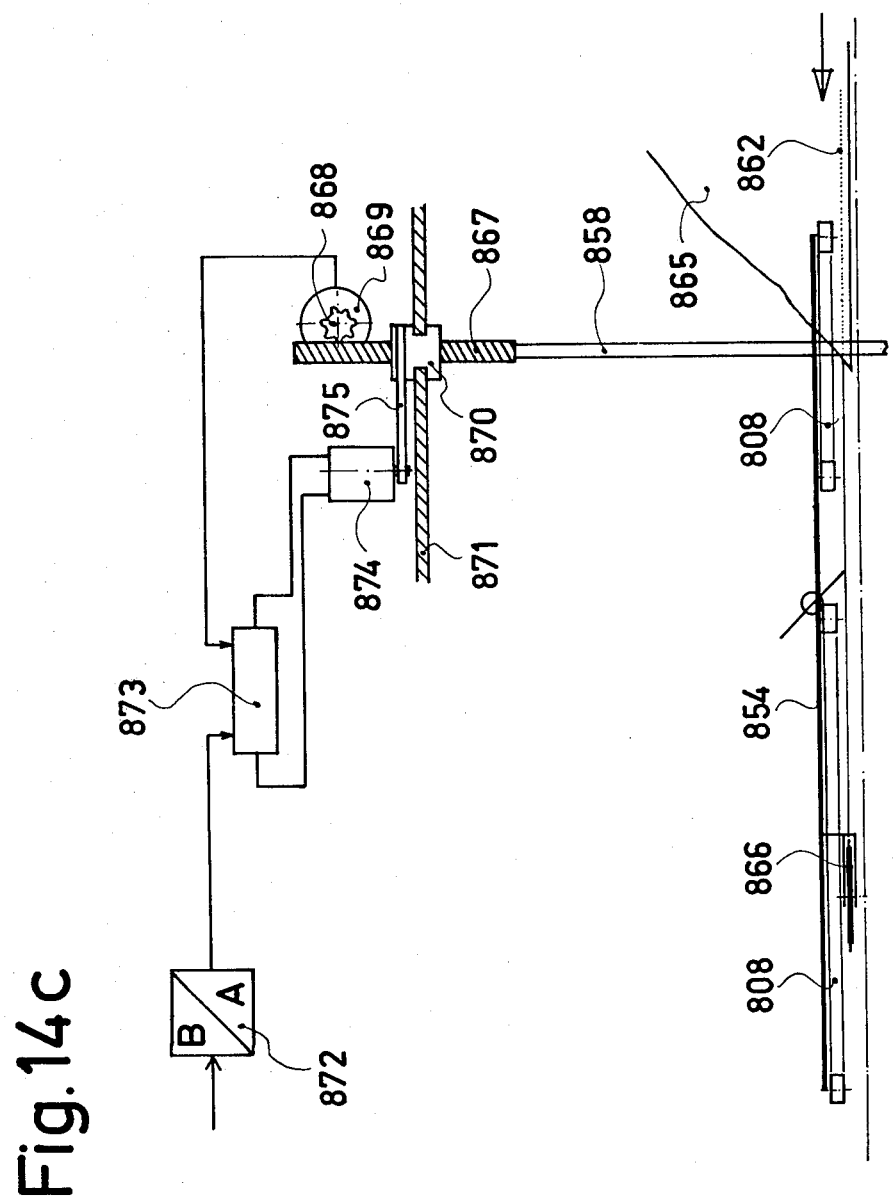

The movement of the frame plates in axial direction along the shafts 855, 856 and 857 is schematically elucidated by FIG. 14c, for the frontal frame plate 854. The tobacco leaf half is shown at 865 and the base line of the first section which is cut out, is to be seen at 862 (compare also FIG. 14a), the frontal narrow belt at 808, a cutting knife for the base line at 866. The steering shaft attached to the frame plate 854 is indicated at 858. One end of this steering shaft is threaded, as shown at 867. The threaded part of the shaft cooperates with a small toothed wheel 868, which in its turn cooperates with a potentiometer 869. The potentiometer reading indicates the position of the steering shaft 858 and thus of the frame plate 854 and of the knife 866 attached to that frame plate. The threaded part 867 of the steering shaft 858 cooperates with the nut 870 which is rotatably attached to a bearing of the main frame 871.

The position of the base line 862 which has to be cut into the tobacco leaf half 865 is electronically stored as previously described. This stored location is fed out in a binary signal and transformed to an analog signal at 872. The electric analog signal is compared at 873 with the electric analog signal of the potentiometer 869. The difference in voltage will actuate the motor 874, in either clockwise or counter clockwise direction, and the motor will stop when the voltages balance each other. When the motor 874 runs it will actuate the nut 870 by means of the belt 875. This will cause movement of the threaded part 867 of the steering shaft 858 and this in its turn will effect the readings of the potentiometer 869 as previously described. As said the motor 874 will stop when the reading of this potentiometer equals the analog input coming from 872.

In discussing FIG. 14 it was said that the cut out parallelogram of tobacco leaf are delivered unto the conveyor belt, indicated with 823, and sucked on this belt by vacuum, applied by the vacuum chamber 828.

After cutting it is desirable, but not necessary, to automatically collect each of the different sized patches at one location. This can be done by applying suction to the patches at appropriate places and times and attaching them to appropriate bobbins.

The present invention is useful not only for cutting leaves but also for analyzing leaves to determine the number and size of possible patches which can be removed and, if desired, their locations. Referring to FIG. 15, the camera and detector 1000 scan the leaf as described above and A, B and C frame analysers 1002, 1004 and 1006 from signals indicating the number and location of all respective patches (see FIG. 13b). These signals are then applied to conventional printer 1008 which generates a proper record. Other suitable displays can of course be alternately employed.

CONTROL SYSTEM

It has been shown in the previous text how the scanning system detects the presence of a tobacco leaf as it passes below it and how it stops this belt by the activation of the electro-magnetic clutch. It has been shown how once the leaf is stationary analysis of the leaf occurs to position parallelogram frames of given sizes in certain sections of the leaf. This having been done the information obtained from the scan is used to control the operation of the mechanical cutting and location system.

By way of example the control system will be described with reference to scanning System I in which three different frame size A, B and C are attempted: to be positioned within the three leaf Sections I, II and III (see FIGS. 13, 13a and 13c). Since the systems for each half of the leaf are identical the control system will be described for only one leaf half.

Having completed the analysis certain information is known for each of the leaf sections as follows:
(a) The frame positioned in that section (i.e. A, B, C or none).
(b) The base line position of that frame in the section (e.g. X or X+$\delta$X for Section I).
(c) The co-ordinate position of one corner of the frame positioned.

The fact that this information is available follows from the foregoing text. FIG. 13g shows the information available at the appropriate positions on the leaf by way of example which will be used for description of the control system. For section I we have base line position bI, positioned frame A and co-ordinate position XYI. Similar data is shown in FIG. 13g for Sections II and III.

We will consider Section I of the leaf first. All movement of the leaf after it has been analysed is monitored using pulse generators attached to the drive shafts of each belt, thus the position for each leaf section can be accurately controlled with reference to any mechanical drive variations.

Description is given in the earlier text of the pulse generators and their attachment to the system.

The co-ordinate position of the frame in Section I of the leaf XYI is preset into the Register (900 in FIG. 13h), this register is then allowed to increment using scaled pulses from a pulse generator attached to the drive of conveyor belt 803'. The scaling circuit 904 is such as to relate exactly the mechanical movement for each pulse of the pulse generator to the equivalent number of picture elements in the television system covered by the same movement. The section is allowed to move until the number in register 900 equals a preset number 902 this equality being found by the Digital Comparator 901. At this point the latch 903 is set to a "1". The preset number 902 corresponds to a fixed position on the edge of the field of view, thus, once it is known that the frame position has reached this point the reset of the position control is fixed and does not need to vary.

As is shown in FIG. 14 the knives 812 and 813 cut the length of the selected frame on the given section of leaf. Thus considering Section I of the leaf once the latch 903 is activated it is possible to gate correctly scaled pulse generator pulses in AND gate 905 into register 906. The comparator 907 compares the number in the register with a preset number 908 and when equality is found sets the latch 909. The preset number represents the number of scaled pulses required from the pulse generators to move the leaf from the fixed position at the edge of the field until the leading edge of the frame is under the cutters. The act of setting the latch 909 also resets latch 903. When latch 909 is set the monostable 917 is activated and this gives a pulse to activate the length cutting knives. Also when latch 909 is set, scaled pulse generator pulses are fed via AND gate 910 to register 911 and comparator 912 compares this number with any of the three preset numbers 913 for frame A, 914 for frame B or 915 for frame C, and the appropriate one will be set dependent upon which of these frames has been accepted in that leaf section. When equality is obtained latch 916 is set and monostable 918 activated which again gives a pulse via the OR gate 919 to activate the cutting knives.

In practice two cutting knives 812 and 813 each cut at the same point and by varying the separation the two cutting knives in the axis parallel with the cutting axis it is possible to cut a wide section (A) or a narrower section (B or C). The actual frame to be placed in any given section is known from the scanning (A or B or C or none). Referring to FIG. 13*i*, each of these frames can be made to represent a given analogue voltage (indicated by block 940) by the Digital to Analogue converter 920. This voltage is fed to one side of the analogue integrator comparator 921 the output of which drives the cutter separator drive unit 922. Now a linear positional feedback will be obtained from the cutter movement by using a sliding potentiometer linked to the movement and this feedback voltage will be applied to the inverting input of amplifier 921. Thus a high degree of accuracy can be obtained in the separation of the cutters.

Also since the base line of the section can vary it is necessary to move the whole cutter assembly in an axis parallel to the cutting axis in order to position the cutters over the correct portion of the leaf half.

The base line information (indicated by block 942) is known from the scanning and hence as for the cutter separation described above the Digital to Analogue converter 923, the analogue integrator comparator 924 and the linear positional feedback from the cutter position 925 can give accurate control over the cutter position.

The width of the sections cut out of the leaf are governed in rotating cutters shown for Section I as 816 and 817 on FIG. 14. These cutters continuously cut the length as it passes. The positioning of these cutters depends upon the position of the base line for cutter 816 and the heights of the frame and the position of the base line for cutter 817.

The base line position is converted to an analogue signal in the D/A converter 926 and fed to an analogue integrator comparator 927 the output of which drives the cutter position 928 and from the cutter position a linear feedback is obtained which is fed to the inverting input on 927. This system will then control very accurately the position of the cutter to follow the base line of the frame.

For the top of frame cutter the output of D/A converter 926 is added to the output of D/A converter 929, which converts the accepted frame height to an analogue signal, in the amplifier 930. Similarly a linear feedback from the cutter positional drive 931 allows accurate definition of the top frame cutter position.

The suction ducts one of which is shown as 829 are such that they have a constant suction applied to remove unwanted parts of the leaf (i.e. all the leaf except the cut frames). To stop the required sections being sucked away the vacuum is turned off as the required parts pass below the suction intakes. To do this the output of register 911 (FIG. 13*h*), which is monitoring the movement of the accepted frame around the belt and drum system of the mechanics, is compared in Digital Comparator 932 with a preset number 933. When equality is obtained (i.e. the leading edge of the frame arriving at the suction duct) the monostable 934 is activated which activates the suction valve 830 to remove the section. The period of the monostable is governed by which frame is accepted (A or B or C) and hence the section is left off for the whole period that the required part of the leaf is passing below the vent.

We claim:

1. A system for the automatic cutting of a portion out of tobacco leaves for cigar wrappers comprising:
    optical means for scanning a plurality of discrete areas of said leaf to locate at least one substantially hole-free region comprised of a plurality of discrete areas free from holes, each said region being of a predetermined form and to store the location of each said hole-free region including a television camera with scanning frames which can be preset to correspond with a preselected variety of frames of preselected size and shape for producing a video output by scanning in each frame a plurality of lines in a scanning direction parallel to the leaf stem, means for deriving from said video output a reference signal, means for comparing said video signal with said reference signal and producing a first binary signal when said reference signal is less than said video signal and a second binary signal when said reference signal is greater than said video signal, means for sequentially storing said first and second binary signals received at an input and for providing the stored signals at an output, logic means having an input connected to said storing and providing means output and to said comparing and producing means and an output to said storing and providing means for applying binary signals to said input to produce a stored signal in said storing and providing means representing superimposed lines and indicating the location of holes at each point of each of said lines along said scanning direction, and means for determining, at the end of scanning, whether said stored signal indicates at least one hole-free area, and
    means for cutting said leaf in accordance with said stored location to produce said portion.

2. A system as in claim 1, wherein said storing and providing means for each scanning frame includes a digital shift register, and said logic means includes an AND gate and a data selector connected between said AND gate and said output of said storing and providing means for delaying the binary signals applied from said output of said storing and providing means so as to produce a parallelogram shaped hole-free region, wherein a given number of cigar wrappers snugly fit.

3. A system as in claim 2, wherein said determining means includes a counter having a reset input and a count input, a gate connecting said data selector to said reset input for resetting said counter whenever a binary signal indicating a hole is applied, and second logic means for applying the stored binary signals to said count input at the end of scanning and a comparator for producing a given output when the counter reaches a predetermined count.

4. A system as in claim 2 for producing a plurality of regions of preselected size and shape sufficiently free from holes whereby the cutting means comprises for each parallelogram a knife responsive to the stored location of the long base line, a knife responsive to the stored location of the long top line, a knife responsive to the stored location of short front line and a knife responsive to the stored location of the short rear line of that parallelogram.

5. A system for the automatic cutting of a portion out of tobacco leaves for cigar wrappers comprising:
    optical means for scanning a plurality of discrete areas of said leaf to locate at least one substantially hole-free region comprised of a plurality of discrete areas free from holes, each said region being of a predetermined form and to store the location of each said hole-free region including means for scanning said leaf along a plurality of parallel lines and producing a sequence of digital signals each indicating the presence or absence of holes within discrete areas along one of said lines, means for superimposing said signals from each of said lines so that each superimposed signal indicates the presence of a hole at any of a plurality of said areas, and means for determining the number of said superimposed composite signals in sequence each of which indicates the absence of a hole, to find a hole-free area of a given size and for storing the location of said hole-free sequence, and means for cutting said leaf in accordance with the stored location to produce said portion.

6. A system as in claim 5 wherein said superimposing means includes means for delaying the signals of each of said lines with respect to the signals from the preceding scanned line so that said hole-free area has the shape of a parallelogram.

7. A system as in claim 5 wherein said digital signals are binary signals and said determining and storing means includes means for counting the number of binary signals indicating hole-free areas, and means for comparing the counted hole free areas with a predetermined number.

8. A system as in claim 7 wherein said determining and storing means indicate the presence of a plurality of hole-free sequences and stores the locations of each of said sequences.

9. A system as in claim 8 wherein said determining and storing means includes a first counter for counting the number of said superimposed signals indicating an absence of holes, a comparator for producing an output indicating detection of a first frame when said count equals a first preselected number, a second counter for counting pulses, a third counter for counting pulses, logic means for disabling said second counter when said comparator produces a first output and enabling said third counter so that said second counter stores the location of one hole-free sequence, and disabling said third counter when said comparator produces a second output so that said third counter stores the location of a second hole-free sequence.

10. A system as in claim 5 wherein said scanning means scans along a plurality of lines parallel to the leaf stem.

11. A system as in claim 5 including means for conveying said leaf to a scanning location, means for detecting when said leaf is in a frame and means for stopping said leaf when said leaf is in said frame.

12. A system as in claim 11 wherein said detecting means includes means for counting the hole-free areas in a narrow window extending transverse to the direction of conveying and means for comparing the count with a predetermined number and producing an output signal when said count equals said predetermined number and wherein said stopping means includes a clutch which operates to stop said conveying means when said output signal is produced.

13. A system as in claim 12 wherein said detecting means includes a first latch connected to said comparing means to be set when said comparing means produces said output signal, a second latch connected to said first latch to be set when said first latch is set to cause said clutch to operate, a first timer connected to said second latch for resetting said second latch a predetermined time after said second latch is set, a second timer for causing said optical means to operate a predetermined time after said second latch is set, and a second comparing means for resetting said first latch when said count in said counting means equals a second predetermined number less than said first number.

14. A system for the automatic cutting of a portion out of tobacco leaves for cigar wrappers comprising:

optical means for scanning a plurality of discrete areas of said leaf to locate at least one substantially hole-free region comprised of a plurality of discrete areas free from holes, each said region being of a predetermined form and to store the location of each said hole-free region, means for locating and storing the number and location of each of a plurality of hole-free areas of different sizes in at least one leaf section, means for selecting one of said areas in accordance with a predetermined priority, and means for cutting said leaf in accordance with said stored location to produce said portion.

15. A system as in claim 14 wherein said locating and storing means includes means for locating and storing the number and location of each of a plurality of hole-free areas of different sizes in a plurality of sections defined between parallel lines along the direction of scanning and wherein said selecting means includes means for selecting one of said areas in each section in accordance with a predetermined priority.

16. A system as in claim 15 including means for selecting the baseline for each of said section in accordance with the height of the preceding scanned section and the detected presence of holes between the top of the previously scanned section and a section dividing line.

17. A system for the automatic cutting of a portion out of tobacco leaves for cigar wrappers comprising:

optical means for scanning a plurality of discrete areas of said leaf to locate at least one substantially hole-free region comprised of a plurality of discrete areas free from holes, each said region being of a predetermined form and to store the location of each said hole-free region including video means for scanning said leaf to produce an analogue signal which varies between a first level when a hole is scanned and a second level when a hole-free area is scanned, means for producing a reference signal having a level which varies with said first and second levels, and means for comparing said analogue signal with said reference signal to produce a binary signal having a first value indicating scanning of a hole and a second value indicating scanning of a hole-free area, and means for cutting said leaf in accordance with said stored location to produce said portion.

18. A system for the automatic cutting of portions out of tobacco leaves, these portions being usable for feeding into cigar wrapping-machines, comprising the following cooperating elements (a) means for removing the main vein from the tobacco leaves, producing two leaf halves;

(b) conveyor means for receiving and moving said leaf halves to a scanning location;

(c) optical means at said scanning location for scanning said leaf halves according to a preselected number of frames chosen out of a preselected variety of frames of preselected shape and size, each frame snugly fitting around a preselected number of cigar wrapper shapes, to locate and select a number of regions on said tobacco leaf halves sufficiently free from holes in such a way that optimal coverage of said leaf halves with said regions is assured according to a preselected priority given to the choice of said regions and electronically store the location of each of said regions;
(d) a second conveyor means for moving said leaf halves to a cutting location;
(e) cutting means, for cutting out the regions selected by the scanning means;
(f) means, responsive to the stored locations, for positioning said regions and said cutting means with regard to one another, in such a way that said regions are cut out when the cutting means mentioned under (e) are actuated;
(g) means for actuating the cutting means when the right position of the cutting means and the selected regions with regard to one another has been attained.

19. A system for the automatic cutting of a portion out of tobacco leaves for cigar wrappers comprising:

optical means for scanning a plurality of discrete areas of said leaf to locate at least one substantially hole-free region comprised of a plurality of discrete areas free from holes, each said region being of a predetermined form and to store the location of each said hole-free region, means for selecting at least one of a plurality of different sized portions to be cut from each of a plurality of leaf sections, means for cutting said leaf in accordance with said stored location to produce said portion including a plurality of knives for cutting a parallelogram shaped portion from said leaf, wherein said optical means includes means for operating said knives, and means for positioning said knives in accordance with the selection so as to cut the selected portions.

* * * * *